(12) United States Patent
Nomura

(10) Patent No.: US 8,681,229 B2
(45) Date of Patent: Mar. 25, 2014

(54) IMAGE PICKUP DEVICE, IMAGE BLUR CORRECTING METHOD, AND PROGRAM

(75) Inventor: Hirofumi Nomura, Saitama (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 12/465,218

(22) Filed: May 13, 2009

(65) Prior Publication Data

US 2009/0316010 A1 Dec. 24, 2009

(30) Foreign Application Priority Data

Jun. 20, 2008 (JP) ................................ 2008-162101

(51) Int. Cl.
*H04N 5/228* (2006.01)

(52) U.S. Cl.
USPC ............... 348/208.5; 348/208.99; 348/208.1; 348/208.2; 348/208.4; 348/208.6; 348/208.7

(58) Field of Classification Search
USPC ................................. 348/208.5, 208.99–208.7
See application file for complete search history.

(56) References Cited

U.S. PATENT DOCUMENTS

| | | | | | |
|---|---|---|---|---|---|
| 5,282,044 | A | * | 1/1994 | Misawa et al. | 348/208.5 |
| 5,712,474 | A | * | 1/1998 | Naneda | 250/208.1 |
| 6,630,950 | B1 | * | 10/2003 | Ohkawara et al. | 348/208.12 |
| 6,734,901 | B1 | * | 5/2004 | Kudo et al. | 348/208.4 |
| 7,495,691 | B2 | | 2/2009 | Yoneda | |
| 7,596,307 | B2 | * | 9/2009 | Tomita et al. | 396/52 |
| 7,711,253 | B2 | * | 5/2010 | Tomita et al. | 396/53 |
| 2002/0047906 | A1 | * | 4/2002 | Ohta | 348/208 |
| 2003/0035053 | A1 | * | 2/2003 | Kyuma et al. | 348/208.2 |
| 2004/0212713 | A1 | * | 10/2004 | Takemoto et al. | 348/333.09 |
| 2005/0168581 | A1 | * | 8/2005 | Shinohara et al. | 348/208.1 |
| 2005/0254805 | A1 | * | 11/2005 | Moriya et al. | 396/53 |
| 2006/0072018 | A1 | | 4/2006 | Inaba et al. | |
| 2006/0222353 | A1 | * | 10/2006 | Moriya | 396/55 |
| 2006/0284984 | A1 | * | 12/2006 | Takemoto et al. | 348/208.99 |
| 2008/0037970 | A1 | * | 2/2008 | Saito et al. | 396/55 |
| 2008/0095459 | A1 | * | 4/2008 | Vitsnudel et al. | 382/260 |
| 2008/0175574 | A1 | * | 7/2008 | Tomita et al. | 396/55 |

FOREIGN PATENT DOCUMENTS

| | | |
|---|---|---|
| JP | 11-146260 | 5/1999 |
| JP | 2004-266322 | 9/2004 |
| JP | 2005-175581 | 6/2005 |

* cited by examiner

*Primary Examiner* — Antoinette Spinks
(74) *Attorney, Agent, or Firm* — Oblon, Spivak, McClelland, Maier & Neustadt, L.L.P.

(57) ABSTRACT

An image pickup device includes: an image pickup optical system configured to form a subject image; an image pickup element configured to generate a picked-up image from the subject image formed by the image pickup optical system; an image blur detecting section configured to output an image blur signal using a motion detecting sensor; an arithmetic section configured to calculate an amount of image blur correction including an amount of optical correction and an amount of electronic correction on a basis of the image blur signal; an optical image blur correcting section configured to move at least one of an optical element forming a part of the image pickup optical system and the image pickup element in accordance with the amount of optical correction; and an electronic image blur correcting section configured to correct electronically an image blur of the picked-up image by image processing based on the amount of electronic correction.

5 Claims, 15 Drawing Sheets

FIG. 8
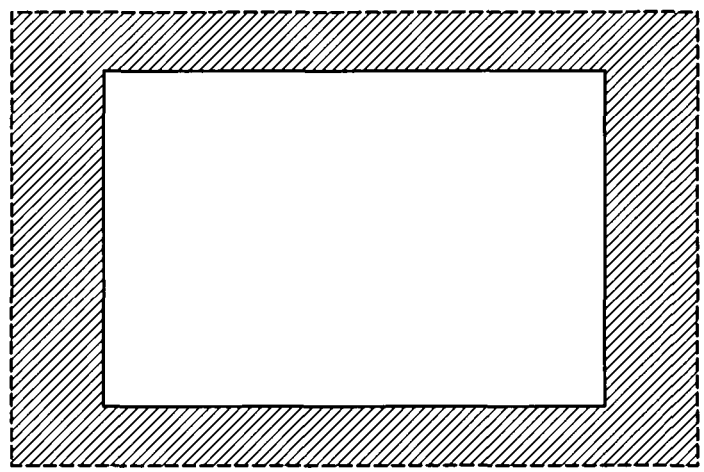
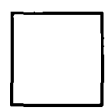 PERFORMANCE REGION
 EFFECTIVE REGION
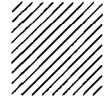 SURPLUS REGION

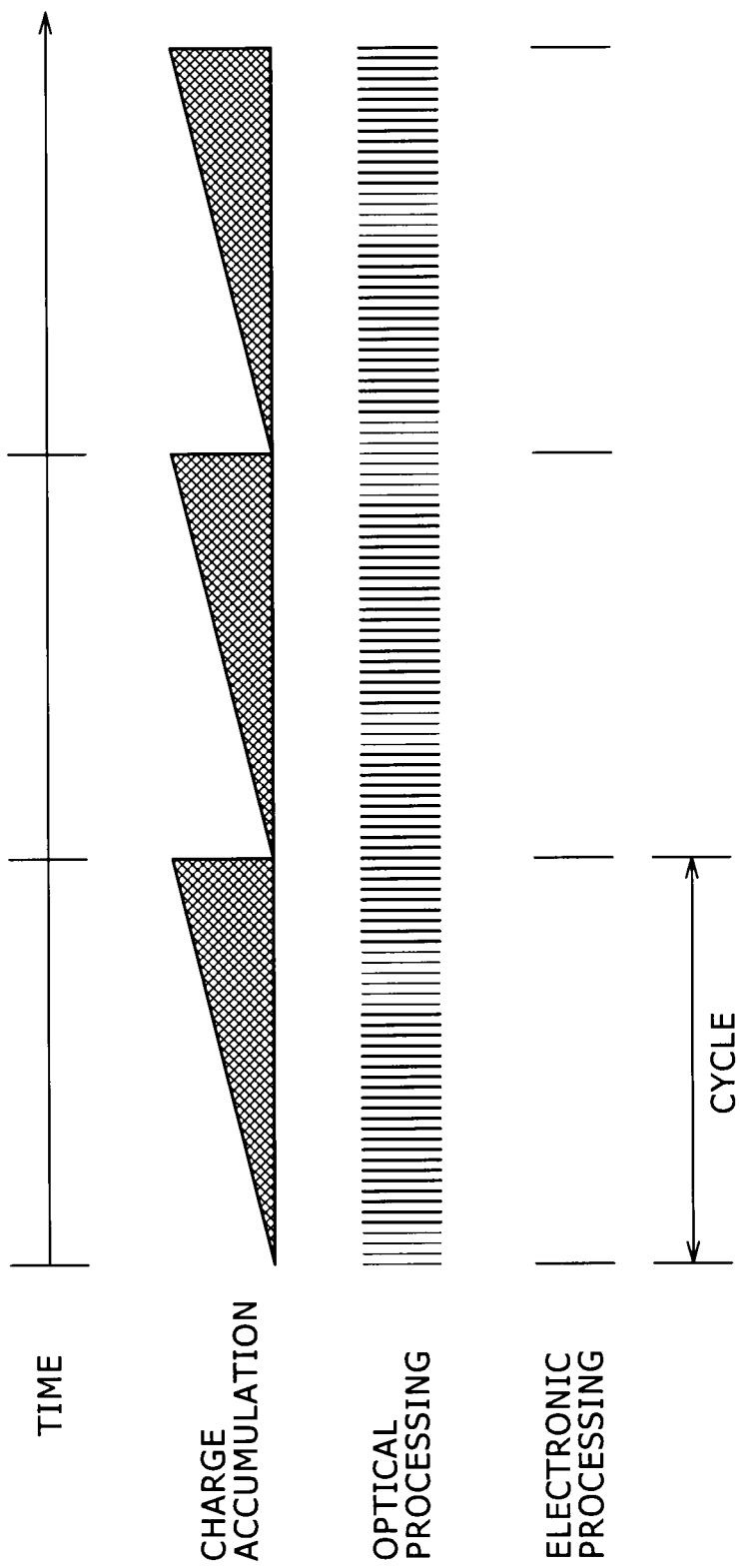

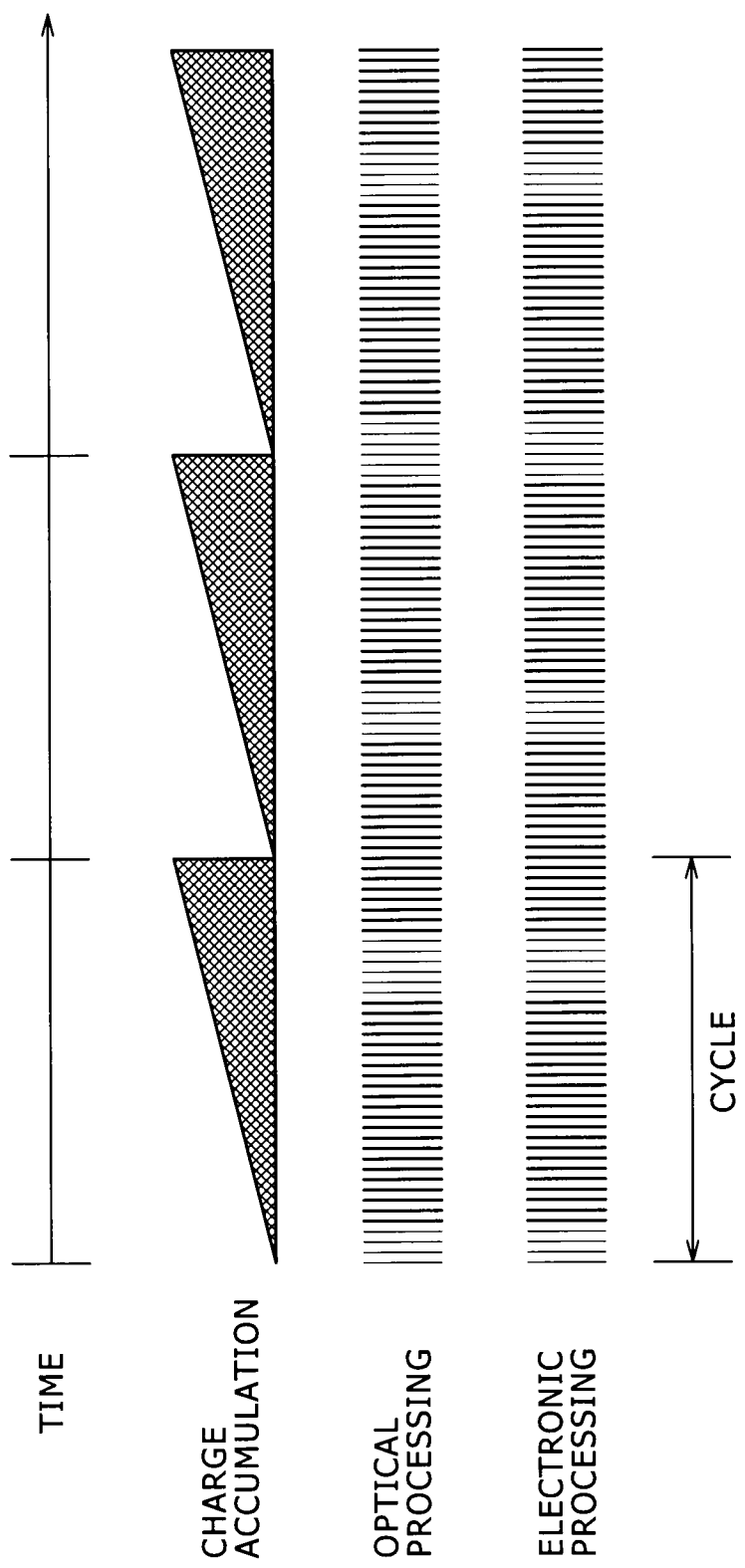

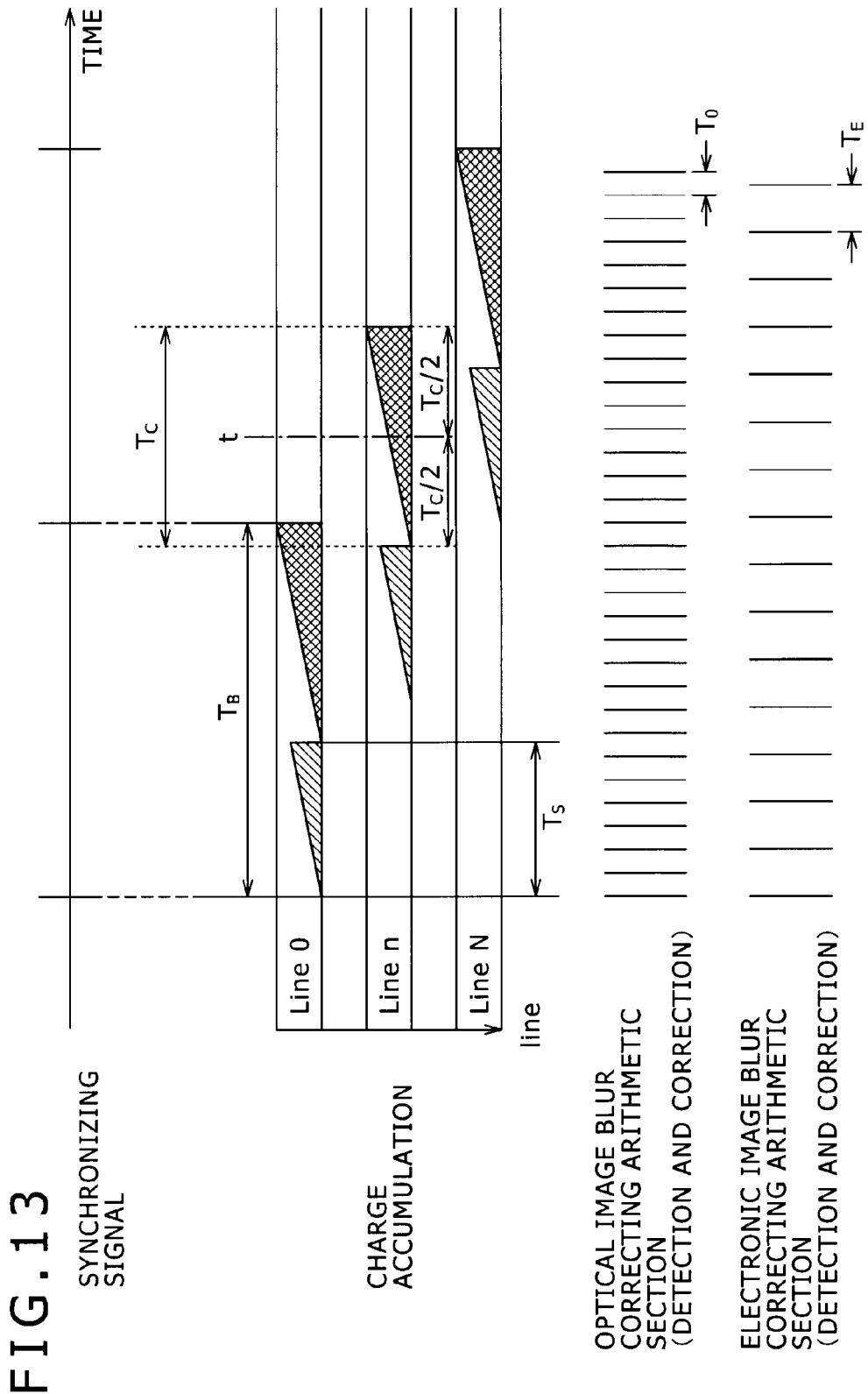

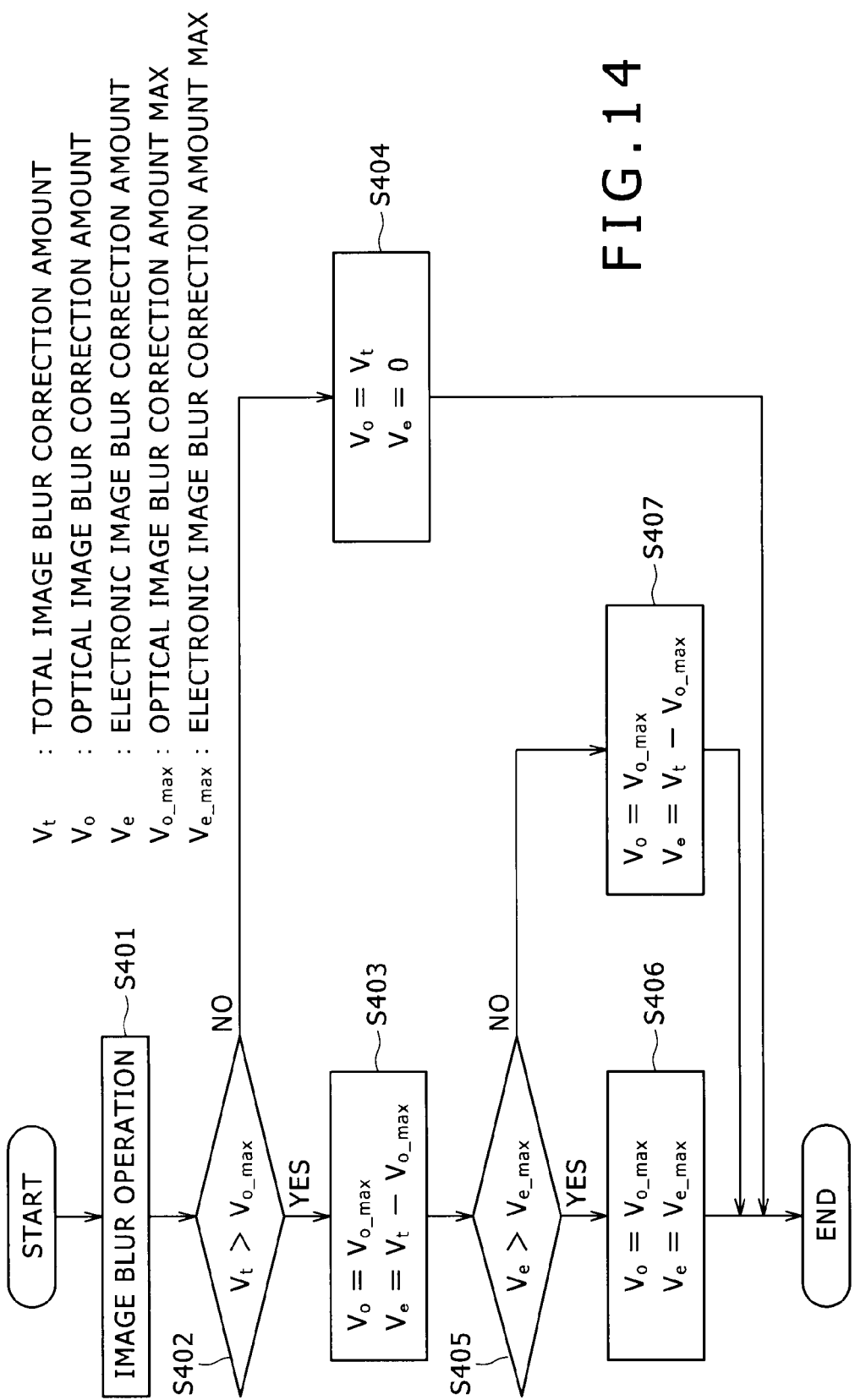

IMAGE PICKUP DEVICE, IMAGE BLUR CORRECTING METHOD, AND PROGRAM

BACKGROUND OF THE INVENTION

1. Field of the Invention

The present invention relates to an image pickup device, an image blur correcting method, and a program that can efficiently process an image blur caused by a vibration or the like.

2. Description of the Related Art

An image picked up by an image pickup device such as a digital camera or the like may have a blur, or a so-called hand movement blur, of a subject image due to for example the shaking of the hand of a user holding the body of a camera at a time of image pickup. Therefore the digital camera incorporates a correcting function for correcting the blur of the subject image (hereinafter referred to as an "image blur") appearing in the picked-up image due to a vibration applied to the body of the camera, including the hand movement of the user.

An optical image blur correction process and an electronic image blur correction process have been known as image blur correction process, and the image blur correction process is realized by cancelling an image blur by these processes.

The optical image blur correction process detects a vibration applied to the body of a camera by an angular acceleration sensor or the like, rotates a prism provided inside an image pickup optical system for forming a subject image in accordance with a result of the detection, and thus changes the direction of an optical axis of the image pickup optical system, whereby an image formed on the light receiving surface of an image pickup element is moved to correct an image blur. The electronic image blur correction corrects an image blur by performing image processing on the picked-up image.

An existing image pickup device using one of the optical image blur correction process and the electronic image blur correction process to perform an image blur correction process can secure a sufficient correction margin to perform correction for an image blur of relatively small amplitude of detected image blur signals. However, for an image blur of large amplitude occurring when image pickup is performed from a moving body such as a car, for example, the existing image pickup device may not secure a sufficient correction margin, and may not perform image blur correction efficiently.

In order to perform a correction process for such an image blur of large amplitude, the existing image pickup device secures a correction margin as follows. A correction margin is secured by widening a correction angle when optical image blur correction is performed, whereas a correction margin is secured by widening a correction surplus region when electronic image blur correction is performed.

However, in the case of optical image blur correction, by widening the correction angle, a lens and an actuator are increased in size, and the image pickup device itself is increased in weight with the increase in size of the lens and the actuator. Further, a large amount of power is consumed for shift driving of the lens increased in size, and various problems such for example as degradation in optical performance due to greatly shaking the lens occur.

In the case of electronic image blur correction, widening the correction surplus region reduces a performance region, and thus degrades the image. In addition, a long image updating cycle degrades correction performance.

Techniques of Japanese Patent Laid-Open No. Hei 11-146260 are proposed for these problems. The techniques of Japanese Patent Laid-Open No. Hei 11-146260 are to achieve blur correction without degradation in image quality by using optical blur correction and electronic blur correction jointly.

SUMMARY OF THE INVENTION

However, in the techniques of Japanese Patent Laid-Open No. Hei 11-146260, the optical blur correction is processed on the basis of blur detection by an angular velocity sensor, while the electronic blur correction is processed on the basis of detection by an image movement detecting circuit. The respective correcting functions of the optical blur correction and the electronic blur correction are present independently of each other within an image pickup device, and the blur detecting mechanisms are also provided independently of each other. Therefore control cannot be performed with consistency achieved between the two processes. When the processes are thus performed independently each other, power consumption is increased, and efficient blur correction cannot be achieved.

Accordingly, the present invention has been proposed in view of such an actual situation, and it is desirable to provide an image pickup device, an image blur correcting method, and a program that make it possible to secure a sufficient correction margin even for an image blur of large amplitude, and perform efficient image blur correction.

According to an embodiment of the present invention, there is provided an image pickup device including: an image pickup optical system configured to form a subject image; and an image pickup element configured to generate a picked-up image from the subject image formed by the image pickup optical system. The device further includes an image blur detecting section configured to output an image blur signal using a motion detecting sensor; an arithmetic section configured to calculate an amount of image blur correction including an amount of optical correction and an amount of electronic correction on a basis of the image blur signal. The device further includes an optical image blur correcting section configured to move at least one of an optical element forming a part of the image pickup optical system and the image pickup element in accordance with the amount of optical correction; and an electronic image blur correcting section configured to correct electronically an image blur of the picked-up image by image processing based on the amount of electronic correction. The arithmetic section includes a separating section configured to separate the image blur signal into a high-frequency component and a low-frequency component, an optical image blur correcting arithmetic section configured to calculate the amount of optical correction on a basis of the high-frequency component, and an electronic image blur correcting arithmetic section configured to calculate the amount of electronic correction on a basis of the low-frequency component.

According to another embodiment of the present invention, there is provided an image blur correcting method including the steps of separating an image blur signal detected by using a motion detecting sensor into a high-frequency component and a low-frequency component. The method further includes the steps of calculating an amount of optical correction on a basis of the high-frequency component; calculating an amount of electronic correction on a basis of the low-frequency component; performing an image blur correction process optically on a basis of the amount of optical correction; and performing an image blur correction process electronically on a basis of the amount of electronic correction.

According to further embodiment of the present invention, there is provided a program for making a computer perform an image blur correcting method, the image blur correcting method including the steps of separating an image blur signal detected by using a motion detecting sensor into a high-frequency component and a low-frequency component. The method further includes the steps of calculating an amount of optical correction on a basis of the high-frequency component; calculating an amount of electronic correction on a basis of the low-frequency component; performing an image blur correction process optically on a basis of the amount of optical correction; and performing an image blur correction process electronically on a basis of the amount of electronic correction.

The image pickup device according to the above-described embodiment of the present invention can separate a detected image blur signal into different frequency bands, and perform a correction process by an optical image blur correction process and an electronic image blur correction process. Therefore, a sufficient correction margin can be secured even for image blurs of large amplitude, and the optical image blur correction process is performed for image blurs of small amplitude. It is thus possible to minimize power consumption, and perform a correction process with little image degradation.

BRIEF DESCRIPTION OF THE DRAWINGS

FIG. 8 is a diagram showing a performance region, an effective region, and a surplus region on an image pickup surface;

FIG. 9 is a diagram showing image blur correction process timing of a charge coupled device sensor;

FIG. 11 is a diagram showing image blur correction process timing of a complementary metal oxide semiconductor sensor;

FIG. 13 is a diagram showing an image updating cycle and charge accumulation timing in each line;

FIG. 14 is a flowchart of assistance in explaining operation control for preferentially performing the optical image blur correction process of the image pickup device according to the present embodiment.

DETAILED DESCRIPTION OF THE PREFERRED EMBODIMENTS

An image pickup device according to an embodiment will hereinafter be described in detail with reference to the drawings.

<System Configuration>

Figure 1:
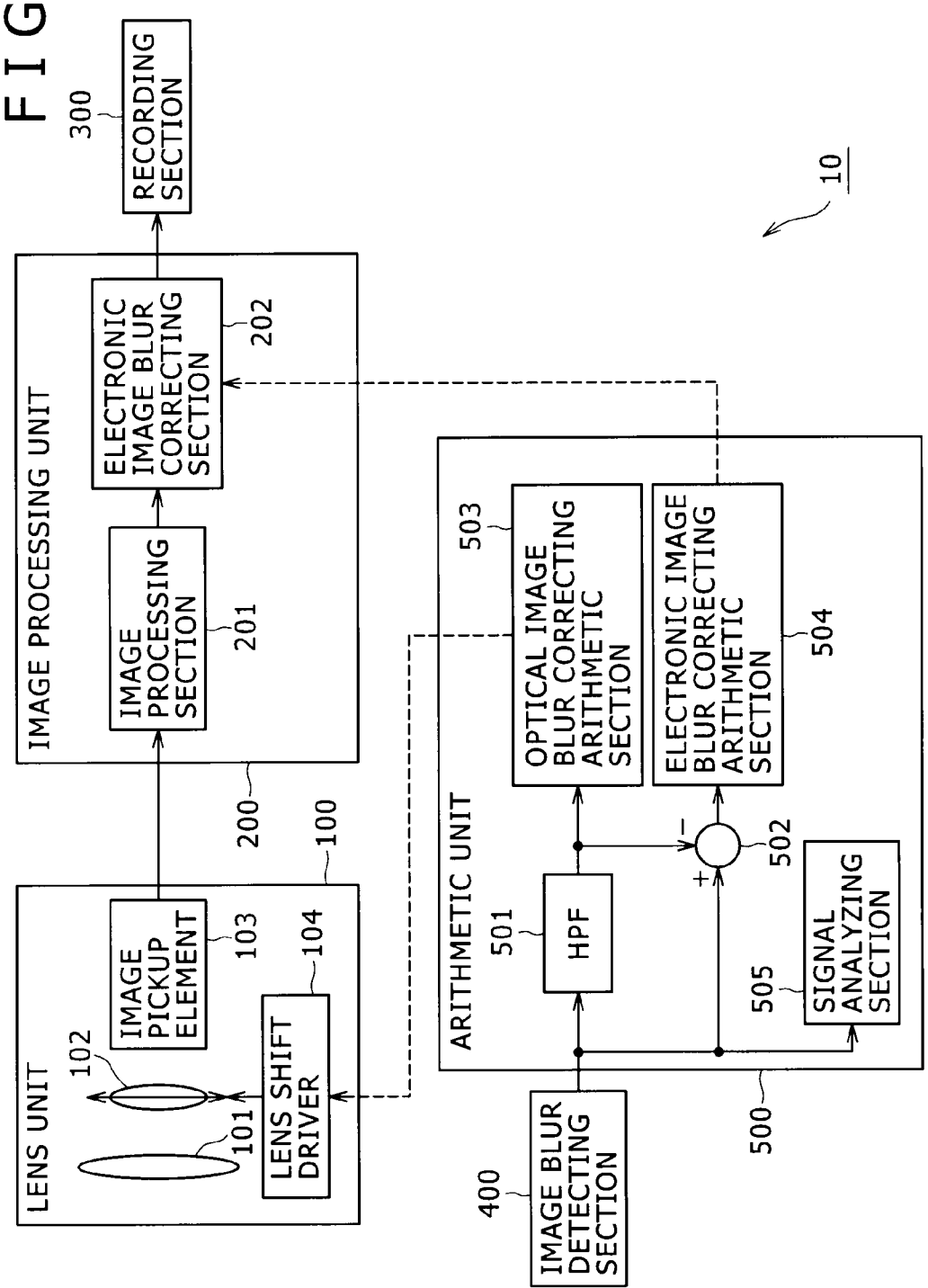
FIG. 1 is a block diagram showing a system configuration of an image pickup device according to an embodiment of the present invention.

FIG. 1 is a diagram showing a system configuration of the image pickup device according to the present embodiment. As shown in FIG. 1, the image pickup device 10 includes: a lens unit 100 for forming a subject image and reading out an image signal corresponding to the subject image; an image processing unit 200 for performing image processing on the image signal read out from the lens unit 100; a recording section 300 for recording image data; an image blur detecting section 400 for detecting an image blur signal using a sensor for detecting movement; and an arithmetic unit 500 for calculating an amount of correction for correcting the image blur signal detected by the image blur detecting section 400.

The lens unit 100 is an image pickup optical system that includes a plurality of optical elements and an image pickup element, and which forms a subject image on the light receiving surface of the image pickup element 103. This lens unit 100 includes: a lens 101; a shift anti-vibration lens 102 for image blur correction; the image pickup element 103 for subjecting a subject image formed in the lens 101 to photoelectric conversion, and capturing the result as an electric signal; and a lens shift driver 104 for controlling the shift anti-vibration lens 102. The image pickup element 103 is formed by a solid-state image pickup element such for example as a CCD (Charge Coupled Device) image sensor or a CMOS (Complementary Metal Oxide Semiconductor) image sensor. In the lens unit 100 having such a constitution, a formed subject image is converted into a digital signal, and the digital signal is output to the image processing unit 200.

More specifically, the lens 101 formed by a plurality of optical elements has a zoom lens group for forming a subject image with variable magnification, and forms the subject image on the light receiving surface of the image pickup element 103. Then, the image pickup element 103 subjects the subject image formed by the lens 101 to photoelectric conversion by a plurality of pixels arranged on the light receiving surface of the image pickup element 103, converts the photoelectrically converted electric signal from an analog form to a digital form, and supplies the converted picked-up image in the digital form to the image processing unit 200.

In the lens unit 100, the shift anti-vibration lens 102 is shifted in a direction orthogonal to the optical axis of the lens 101 on the basis of an amount of optical image blur correction output from an optical image blur correcting arithmetic section 503 to be described later, whereby an image blur caused by a vibration applied to the device is optically corrected. Incidentally, various optical image blur corrections are known. For example, an image blur may be corrected by moving the light receiving surface of the image pickup element 103 in an x-direction and a y-direction, which are directions orthogonal to the optical axis. Incidentally, the x-direction and the y-direction are orthogonal to each other. In addition, an image blur may be corrected by providing a prism in place of the shift anti-vibration lens 102 in the lens unit 100 and moving the prism in a rotation direction with the x-direction and the y-direction as an axis.

The image processing unit 200 performs image processing on the digital image signal output from the lens unit 100. The image processing unit 200 includes an image processing section 201 and an image blur correcting section 202.

The image processing section 201 processes the digital signal output from the image pickup element 103 in the lens unit 100. The image processing section 201 subjects the digital signal to image processing such for example as brightness correction, color correction, and gamma correction by a digital gain, converts the resulting digital signal into a storage format in the recording section 300 to be described later or a data format corresponding to the display form of a display section not shown in the figure, and then supplies the processed digital signal to the electronic image blur correcting section 202. The electronic image blur correcting section 202 is a block for performing an electronic image blur correction process. The electronic image blur correcting section 202 performs an electronic image blur correction process by image processing in accordance with an amount of image blur correction specified by an electronic image blur correcting arithmetic section 504 to be described later.

Incidentally, while description of the image processing unit 200 has been made by taking an example in which the image processing section 201 performs image processing on the digital signal and thereafter the digital signal resulting from the image processing is supplied to the electronic image blur correcting section 202, the present invention is not limited to this. Image processing may be performed in the image processing section 201 after a correction process is performed in the electronic image blur correcting section 202.

The recording section 300 records the digital image signal supplied from the image processing unit 200. The recording section 300 also performs a process of outputting a digital image signal stored in the recording section 300 to the image processing unit 200 in accordance with a control instruction from the arithmetic unit 500 to be described later, for example.

The image blur detecting section 400 detects an image blur signal when a vibration is applied to the image pickup device using a motion detecting sensor, and outputs the image blur signal to the arithmetic unit 500 to be described later. Specifically, the image blur detecting section 400 is realized by a sensor such as an angular velocity sensor or the like to detect movement of the image pickup device proper. For example, when the image blur detecting section 400 is realized by a gyro sensor detecting an angular velocity, the image blur detecting section 400 detects an amount of vibration based on data on an angular velocity applied in each of a pitching direction and a yawing direction, and supplies an image blur signal based on the detected amount of vibration to the arithmetic unit 500. Incidentally, the image blur detecting section 400 may detect the movement of the image pickup device proper using an acceleration sensor.

The arithmetic unit 500 is formed by a CPU (Central Processing Unit) or the like. The arithmetic unit 500 performs a correcting operation on the basis of the amount of vibration detected by the image blur detecting section 400, calculates an amount of image blur correction for correcting the movement involved in a blur, and outputs an indication of the amount of correction. Such an arithmetic unit 500 includes an HPF 501, a subtracting section 502, an optical image blur correcting arithmetic section 503, an electronic image blur correcting arithmetic section 504, and a signal analyzing section 505.

The HPF 501 extracts a high-frequency component of the image blur signal output from the image blur detecting section 400, and outputs the high-frequency component to the optical image blur correcting arithmetic section 503.

The subtracting section 502 subtracts the high-frequency component output by the HPF 501 from the image blur signal output from the image blur detecting section 400. The subtracting section 502 thereby extracts a low-frequency component of the image blur signal.

The optical image blur correcting arithmetic section 503 calculates an amount of image blur correction on the basis of the output value of the HPF 501. The optical image blur correcting arithmetic section 503 outputs the amount of image blur correction to the lens shift driver 104 in the lens unit 100.

The electronic image blur correcting arithmetic section 504 calculates an amount of image blur correction for moving a performance region using a surplus region used for image blur correction on the basis of the output value of the subtracting section 502. The electronic image blur correcting arithmetic section 504 outputs the amount of image blur correction to the image blur correcting section 202 in the image processing unit.

The signal analyzing section 505 analyzes a characteristic of the image blur signal output from the image blur detecting section 400, and instructs the lens shift driver 104. Specifically, the signal analyzing section 505 makes it possible to check an amplitude state such as the magnitude of amplitude of the image blur signal, and to increase power to the lens shift driver 104 and thereby secure a sufficiently large correction angle when the image blur signal has large amplitude, for example. By thus analyzing the magnitude of amplitude of the image blur signal and performing an optical correction process on the basis of the amplitude state of the image blur signal, it is possible to control an amount of power and the like, and reduce an amount of power consumption. Details will be described later.

Figure 2:
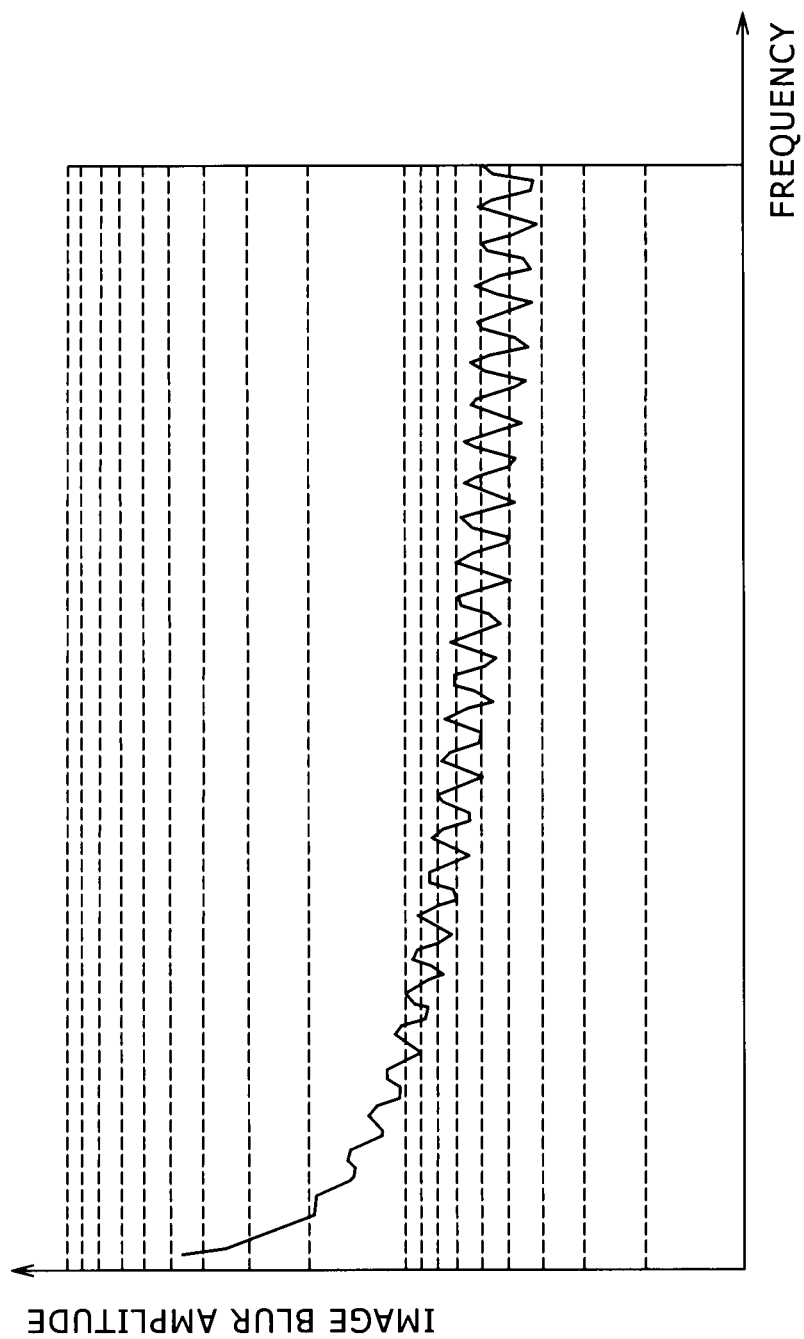
FIG. 2 is a graph showing relation between image blur frequency and amplitude.

Each of the processing sections and units of the image pickup device 10 according to the present embodiment formed of such a constitution can be operated at an operating frequency as follows. The image blur detecting section 400 performs sampling at a frequency higher than that of the high-frequency component of the image blur signal. This makes it possible to detect the image blur signal with high accuracy. The cutoff frequency of the HPF 501 is set at a frequency of amplitude where the amplitude of the high-frequency component is within a movable range of the shift anti-vibration lens 102 in a characteristic between image blur amplitude and frequency as shown in FIG. 2. In addition, the operating frequency of the optical image blur correcting arithmetic section 503 is set higher than the high-frequency component of the image blur correcting signal. Further, the operating frequency (correcting frequency) of the electronic image blur correcting arithmetic section 504 is the same as an image updating frequency (NTSC (National TV Standards Committee) system: 60 Hz, and PAL (Phase Alternating Line) system: 50 Hz), and is operated at the image updating frequency or higher in order to make the sampling point of the image blur signal coincide with the center of an exposure period.

Specifically, as an example of frequencies that satisfy the above operating frequency conditions, for example, the image blur detecting section 400 is operated at 4 kHz, which is sufficiently higher than the high-frequency component of the image blur signal, and the cutoff frequency of the HPF 501 is operated at 2 Hz at which frequency the amplitude of the high-frequency component falls within the movable range of the shift anti-vibration lens 102. The optical image blur correcting arithmetic section 503 is operated at the same frequency of 4 kHz as the image blur detecting section 400, and the electronic image blur correcting arithmetic section 504 is operated at 1 kHz, which is higher than the image updating frequency and is a frequency necessary to make the center of an exposure period coincide with a sampling point. Incidentally, the operating frequency conditions are an example, and of course the present invention is not limited to this.

Thus, in the image pickup device 10 according to the present embodiment, an image blur signal detected in the image blur detecting section 400 is separated into a high-frequency component and a low-frequency component in the arithmetic unit 500, a correcting operation is performed for each of the separated image blur signals in the respective frequency bands, and then an image blur correction process is performed. Specifically, an amount of optical correction is calculated on the basis of the image blur signal of the high-frequency component of the separated image blur signals, and an image blur is corrected optically in accordance with the calculated amount of optical correction. Meanwhile, an amount of electronic correction is calculated on the basis of the image blur signal of the low-frequency component of the separated image blur signals, and an image blur is corrected electronically in accordance with the calculated amount of electronic correction.

Figure 3:
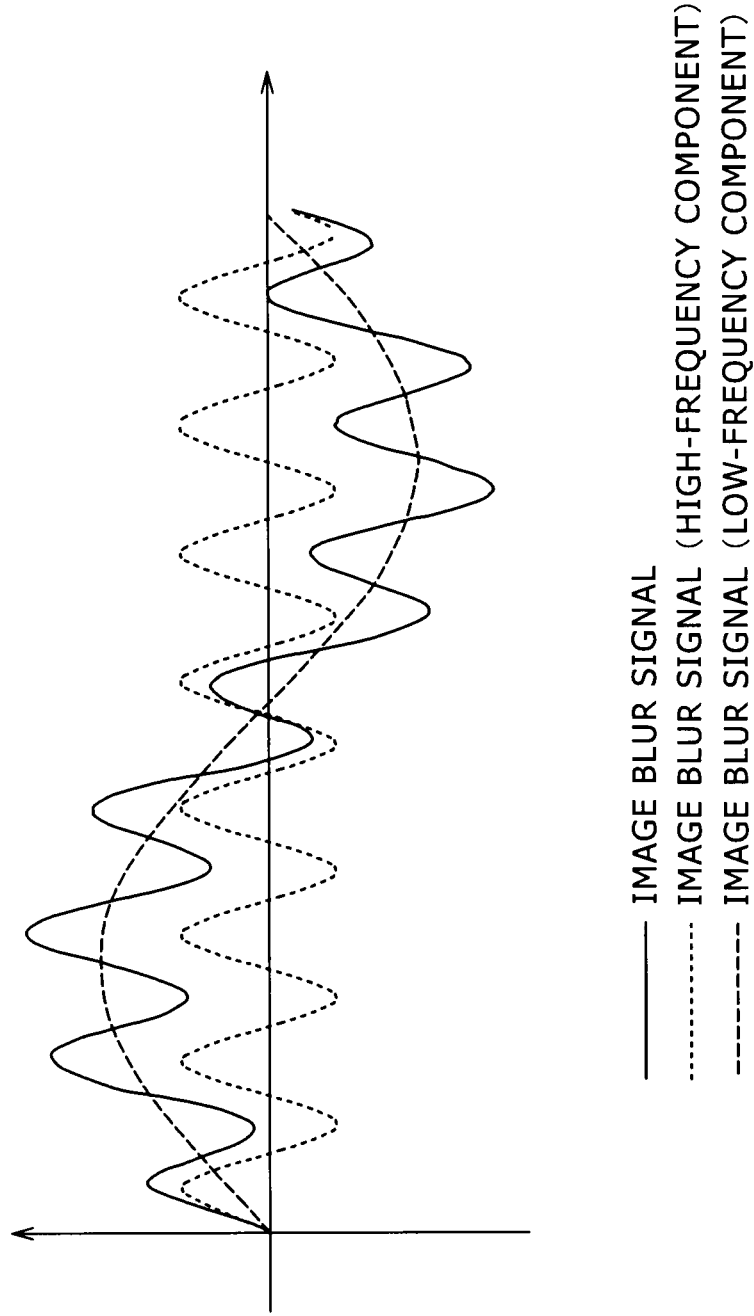
FIG. 3 is a diagram showing the waveforms of an image blur signal and each frequency component of the image blur signal.

FIG. 2 shows an example of a relation between the frequency of the image blur signal and the image blur amplitude of the image blur frequency, whose relation is generally obtained. FIG. 3 shows the waveforms of the image blur signal and each frequency component of the image blur signal.

As is understood from FIG. 2 and FIG. 3, in general, the high-frequency component of the image blur signal has small amplitude, and the low-frequency component of the image blur signal has large amplitude. That is, the image blur signal tends to have large amplitude in a low-frequency band.

As described above, for example, when image blurs over all frequency bands are to be cancelled by optical image blur correction, a correction angle is widened, and thus a correction margin is secured so as to be able to deal with an image blur of large amplitude. In this case, however, the lens and an actuator are increased in size and are increased in weight with the increase in size, and power consumption for driving the lens is increased. In addition, various problems such as degradation in optical performance and the like are caused by greatly shaking the lens, thus making it difficult to achieve efficient image blur correction.

On the other hand, when image blurs over all frequency bands are to be cancelled by electronic image blur correction, a correction surplus region is widened, and thus a correction margin is secured so as to be able to deal with an image blur of large amplitude. In this case, however, degradation in image quality due to a reduction in performance region, degradation in correcting performance due to a long image updating cycle as compared with optical image blur correction, and the like again make it difficult to achieve efficient image blur correction.

Accordingly, the image pickup device 10 according to the present embodiment performs an optical image blur correction process and an electronic image blur correction process on an image blur caused by movement or vibration applied to the device, as described above. It is thus possible to secure a sufficient correction margin for image blurs of large amplitude by merely securing a smaller correction margin for each of the optical correction process and the electronic correction process than when an image blur correction process is performed by the optical correction process or the electronic correction process alone. Then, problems such as increase in size of the device, image degradation and the like, which have been occurring, can be eliminated.

Further, the image pickup device 10 according to the present embodiment differentiates a correction system for different frequency bands of the image blur signal in performing the optical image blur correction process and the electronic image blur correction process on the image blur signal. Specifically, the image pickup device 10 separates the image blur signal detected in the image blur detecting section 400 into a high-frequency component and a low-frequency component, performs the optical image blur correction process on the image blur signal of the high-frequency component in accordance with a calculated amount of optical image blur correction, and performs the electronic image blur correction process on the image blur signal of the low-frequency component in accordance with a calculated amount of electronic image blur correction.

The image blur signal of the high-frequency component is processed by optical image blur correction because of an advantage of optical image blur correction characteristics for high frequencies. That is, the electronic image blur correcting section 202 performing the electronic image blur correction process is strongly dependent on the broadcasting system (the NTSC (National Television System Committee) system, the PAL (Phase Alternating Line)) system or the like, and thus cannot perform correction at frequencies higher than the image updating cycle (60 Hz in the NTSC system or 50 Hz in the PAL system). On the other hand, the lens shift driver 104 is not dependent on the broadcasting system, and thus can be driven at high frequencies. Therefore, of the image blur signals, the image blur signal in a high-frequency band is subjected to the optical image blur correction process, and the image blur signal in a low-frequency band is subjected to the electronic image blur correction process.

By thus separating an image blur signal into a high-frequency component and a low-frequency component and performing a correction process in accordance with the frequency characteristics of the image blur signal, an image blur correction process adjusted to the frequency characteristics can be performed, and effective image blur correction can be achieved.

As will be described later in detail, even when both the optical image blur correction process and the electronic image blur correction process are made possible within an image pickup device, if an optical image blur correcting section and an electronic image blur correcting section are present independently of each other within the device, it is difficult to achieve consistency between the optical image blur correction process and the electronic image blur correction process, so that a desired image blur correction result cannot be obtained.

However, in the image pickup device 10 according to the present embodiment, the image blur signal from the image blur detecting section 400 is output to the arithmetic unit 500 configured so as to enable collective control of the image blur detecting section and the image blur arithmetic sections, and each correction process amount is calculated. It is therefore easy to achieve consistency between the optical image blur correcting section and the electronic image blur correcting section, so that a desired image blur correction result can be obtained easily.

The image blur correction process of the image pickup device 10 having the above-described constitution will be described below in more detail.

<Optical Image Blur Correction Process>

Figure 4:
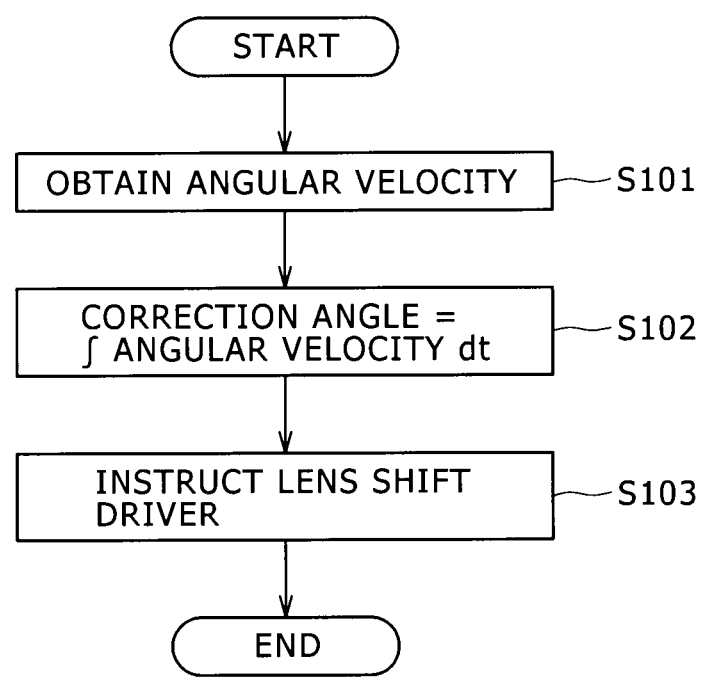
FIG. 4 is a flowchart of assistance in explaining a process of calculating an amount of optical image blur correction in the image pickup device according to the present embodiment.

The optical image blur correction process in the image pickup device 10 according to the present embodiment will first be described with reference to FIG. 4. FIG. 4 is a process flow of assistance in explaining a process of calculating an amount of optical image blur correction.

In the image pickup device 10 according to the present embodiment, as described above, an image blur signal detected in the image blur detecting section 400 is output to the arithmetic unit 500, and the image blur signal is passed through the HPF 501 to extract an image blur signal of a high-frequency component. Then, the image blur signal of the extracted high-frequency component is output to the optical image blur correcting arithmetic section 503. The optical image blur correcting arithmetic section 503 first obtains an angular velocity from the image blur signal of the extracted high-frequency component in step S101.

Specifically, when an angular velocity sensor such as a gyro sensor or the like is used in the image blur detecting section 400, the angular velocity sensor is composed of an x-direction movement detecting sensor for detecting the movement of the image pickup device proper in an x-direction and a y-direction movement detecting sensor for detecting the movement of the image pickup device proper in a y-direction. Amounts of positional movement in the x-direction and the y-direction are detected by these movement detecting sensors. The optical image blur correcting arithmetic section 503 obtains an angular velocity from the amounts of positional movement. Incidentally, the image blur detecting sensor used in the image blur detecting section 400 is not limited to the angular velocity sensor, and a three-axis acceleration sensor, for example, may be used.

After thus obtaining the angular velocity of the image blur signal of the high-frequency component extracted in step S101, the optical image blur correcting arithmetic section 503 in next step S102 calculates a correction angle by time integration of the obtained angular velocity as in an equation shown in the following.

$$\text{Correction Angle} = \int \text{Angular Velocity } dt$$

After calculating the correction angle in step S102, the optical image blur correcting arithmetic section 503 in next step S103 supplies information on the calculated correction angle to the lens shift driver 104 in the lens unit 100.

By the flow of the optical image blur correction process, the optical image blur correcting arithmetic section 503 determines a correction angle from an angular velocity for the high-frequency component of an image blur which component is output from the HPF 501, and indicates the correction angle to the lens shift driver 104. As a result, the image pickup element 103 is exposed to light in a state of the high-frequency component of the image blur being cancelled out.

Specifically, as described above, the image pickup device 10 detects a vibration applied to the device proper, and moves the shift anti-vibration lens 102 in a direction orthogonal to the optical axis of the lens 101 under control of the lens shift driver 104 in accordance with a result of the detection. Thereby an image blur caused by the vibration applied to the device is optically corrected.

That is, the image pickup device 10 performs control so as to eliminate the movement of a subject image on the light receiving surface of the image pickup element 103 by changing the optical axis of the lens unit 100.

Incidentally, irrespective of the above-described optical image blur correction process, the image pickup device 10 may perform a correction process as follows. The image pickup device 10 may correct an image blur by moving the image pickup element 103 in the x-direction and the y-direction instead of moving the shift anti-vibration lens 102. In addition, the image pickup device 10 may correct an image blur by being provided with a prism in place of the shift anti-vibration lens 102 in the lens unit 100 and moving the prism in a rotation direction with the x-direction and the y-direction as an axis. Similarly, the image pickup device 10 may optically correct an image blur by moving the image pickup element 103 in a rotation direction with the x-direction and the y-direction as an axis.

<Control of Optical Correction Angle Range>

As described above, the image pickup device 10 according to the present embodiment performs the optical image blur correction process on an image blur signal in a high-frequency band extracted by the HPF 501. However, there are differences in magnitude of amplitude between image blur signals present in the high-frequency band, and it is thus desirable to control the lens unit 100 appropriately in accordance with the magnitude of the amplitude. It is thereby possible to perform the optical image blur correction process with a minimum necessary amount of power, and thus reduce power consumption. Accordingly, the image pickup device 10 according to the present embodiment has the signal analyzing section 505 in the arithmetic unit 500 to analyze a characteristic relating to for example the magnitude of amplitude of an image blur signal produced in the image pickup device 10 and determine a correction angle range using information on the analysis. A mechanism for controlling the optical correction angle range will be described below in detail.

Figure 5:
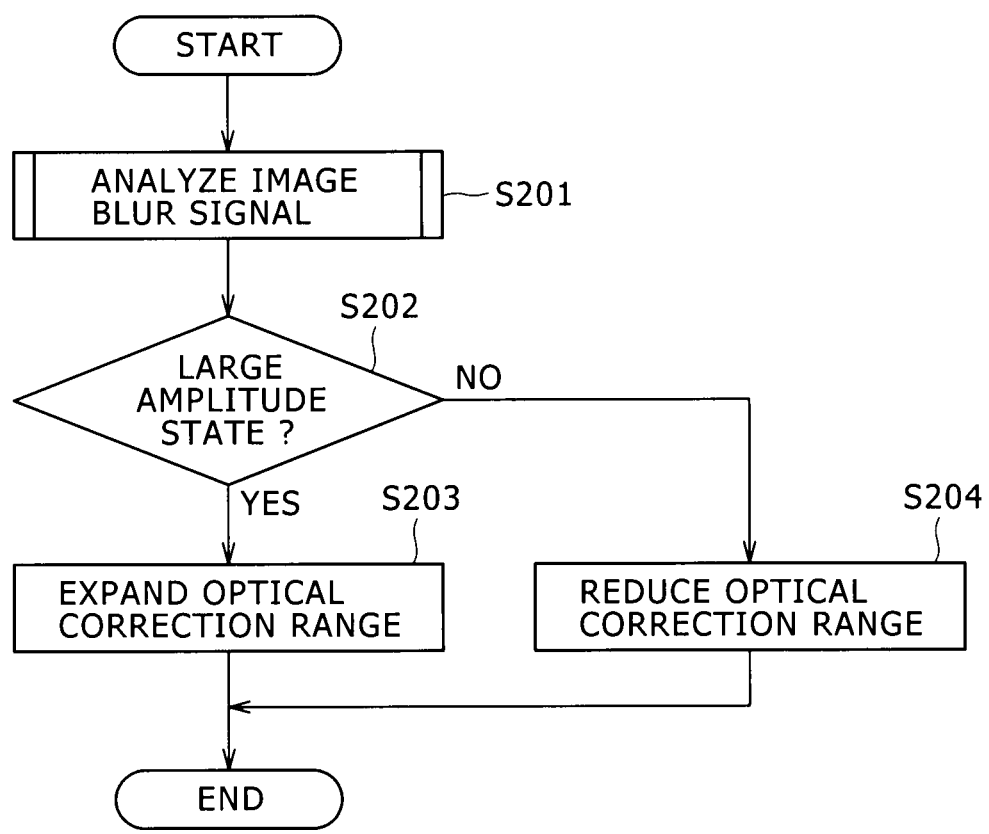
FIG. 5 is a flowchart of assistance in explaining a process of controlling a correction angle range of optical image blur correction in the image pickup device according to the present embodiment.

FIG. 5 is a control flow of assistance in explaining control of a correction angle in the optical image blur correction process of the image pickup device 10 according to the present embodiment.

When the image pickup device 10 according to the present embodiment detects an image blur caused by a vibration applied to the image pickup device 10 in the image blur detecting section 400 as described above, the image blur signal is output to the arithmetic unit 500 and passed through the HPF 501 so that the image blur signal is separated into a high-frequency component and a low-frequency component, and an amount of correction for each frequency band is calculated. At this time, the image pickup device 10 according to the present embodiment in first step S201 also outputs the detected image blur signal to the signal analyzing section 505 and analyzes the image blur signal in the signal analyzing section 505.

Specifically, for example, frequency analysis such as a fast Fourier transform (FFT) or the like is performed. For example, when the high-frequency component is high, it is determined that the image pickup device 10 is in a state of a user walking or a state of being present in a moving body such as a car or the like, and when the low-frequency component is high, it is determined that the image pickup device 10 is in a state of panning or tilting.

After the signal analyzing section 505 first thus analyzes the state of the image blur signal from the detected image blur signal, whether or not the amplitude of the image blur is large is determined next in accordance with the analyzed state in step S202.

Specifically, for example, when it is determined that the image pickup device 10 is in a state of a user walking, it is determined that the amplitude of the detected image blur is in a large state (large amplitude state). When it is determined in step S202 that the amplitude of the image blur is in a large amplitude state (YES in step S202: Y), the process proceeds to step S203. When it is determined in step S202 that the amplitude of the image blur is not in a large amplitude state (NO in step S202: N), on the other hand, the process proceeds to step S204.

When it is determined in step S202 that the amplitude of the image blur is in a large amplitude state, an optical correction range is expanded in next step S203 to enable an optical image blur correction process ready for the image blur signal of the detected large amplitude.

When it is determined in step S202 that the amplitude of the image blur is not in a large amplitude state, on the other hand, the process next proceeds to step S204 to enable a correction process such that the optical correction range is reduced.

Figure 6:
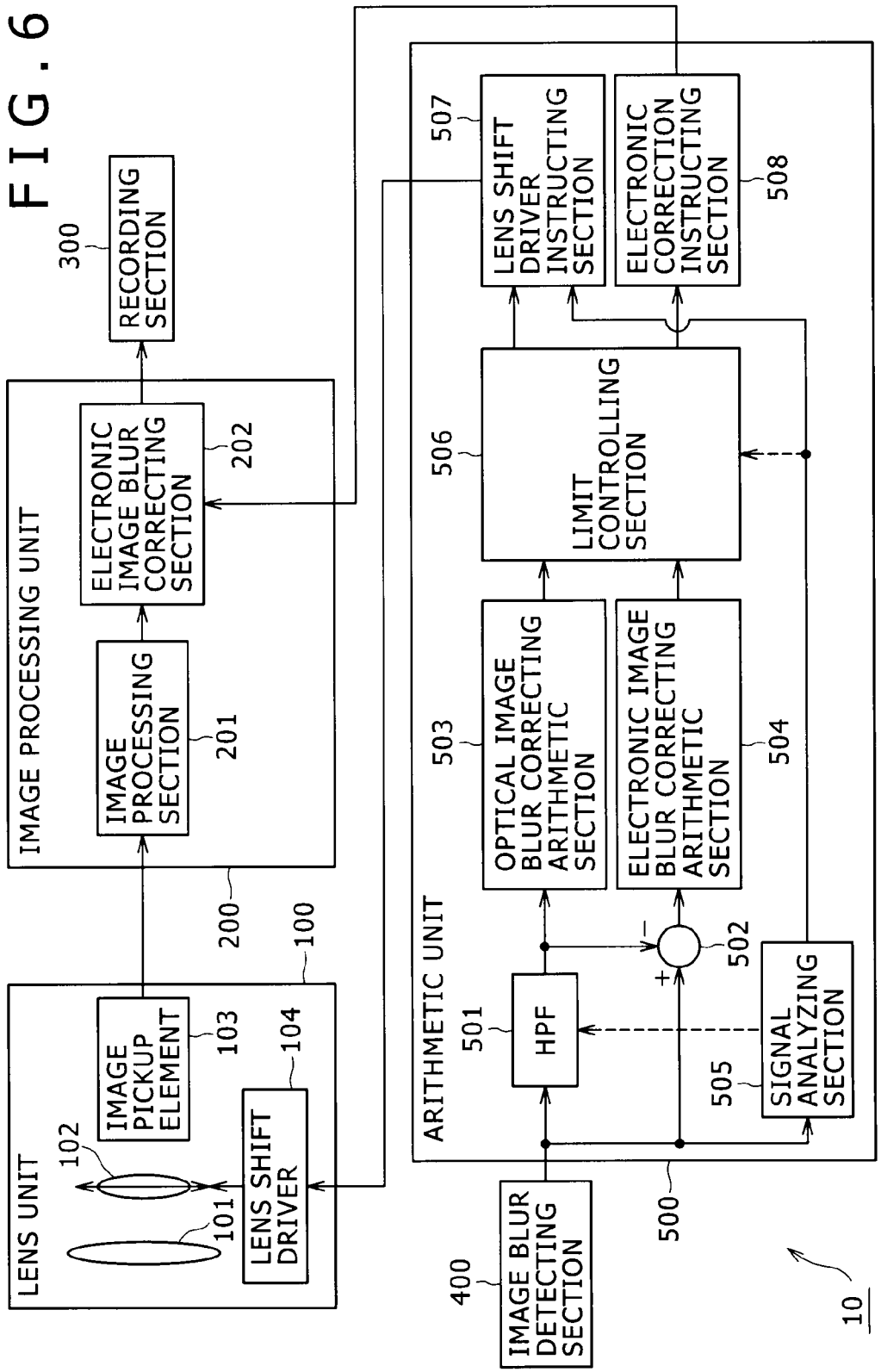
FIG. 6 is a block diagram showing a system configuration of the image pickup device according to the present embodiment.

The process of expanding the optical correction range or reducing the optical correction range in step S203 or step S204, respectively, will be described specifically with reference to FIG. 6. Incidentally, FIG. 6 is a block diagram showing another example of configuration of the image pickup device 10 according to the present embodiment. In the configuration of FIG. 6, parts identified by the same reference numerals as in the image pickup device 10 of FIG. 1 perform the same process, and description thereof will be omitted in the following. As shown in FIG. 6, the arithmetic unit 500 in the image pickup device 10 further includes a lens shift driver instructing section 507 in addition to the configuration described with reference to FIG. 1. Incidentally, a limit controlling section 506 and an electronic correction instructing section 508 in FIG. 6 will be described later.

In step S203, the optical image blur correcting arithmetic section 503 calculates an amount of optical image blur correction on the basis of the image blur signal of the high-frequency component passed through the HPF 501, and information indicating that the image blur signal is a large amplitude signal from the signal analyzing section 505 that has analyzed the characteristic of the detected image blur signal is output to the lens shift driver instructing section 507. Then, the lens shift driver instructing section 507 instructs the lens shift driver 104 in the lens unit 100 to expand the optical correction angle range on the basis of the amount of correction calculated in the optical image blur correcting arithmetic section 503 and the information supplied from the signal analyzing section 505. Thus, when it is determined that the image blur signal has large amplitude, the optical correction range is expanded on the basis of the information from the signal analyzing section 505.

In step S204, as described above, the optical image blur correcting arithmetic section 503 calculates an amount of optical image blur correction, and information indicating that the image blur signal is a small amplitude signal from the signal analyzing section 505 is output to the lens shift driver instructing section 507. Then, the lens shift driver instructing section 507 instructs the lens shift driver 104 in the lens unit 100 to reduce the optical correction angle range on the basis of the amount of correction calculated in the optical image blur correcting arithmetic section 503 and the information supplied from the signal analyzing section 505. Thus, when it is determined that the image blur signal has small amplitude, the optical correction range is reduced on the basis of the information from the signal analyzing section 505.

The process is ended after thus performing control to change the optical correction range on the basis of signal analysis in the signal analyzing section 505.

As described above with reference to one example of the control flow of FIG. 5 and the block diagram of FIG. 6, the image pickup device 10 according to the present embodiment has the signal analyzing section 505 in the arithmetic unit 500. The signal analyzing section 505 analyzes the magnitude of amplitude of a detected image blur signal, and supplies information on the magnitude of the amplitude to the lens shift driver instructing section 507. Then, the lens shift driver instructing section 507 supplied with the information on the magnitude of the amplitude and an amount of correction calculated in the optical image blur correcting arithmetic section 503 controls the lens shift driver 104 in the lens unit 100. Thereby, in a small amplitude state, power consumption is reduced by suppressing the movement of the shift anti-vibration lens 102 in accordance with an instruction from the lens shift driver instructing section 507, so that an image blur correction process can be performed with a minimum necessary power.

In addition, optical image blur correction with higher accuracy can be achieved by thus calculating an amount of correction on the basis of the characteristic information from the signal analyzing section 505.

Incidentally, the above description has been made of an example in which the characteristic information analyzed by the signal analyzing section 505 in the arithmetic unit 500 is output to the lens shift driver instructing section 507 and the lens shift driver instructing section 507 controls the lens shift driver 104 by indicating a correction angle range to the lens shift driver 104 on the basis of the characteristic information and the amount of correction calculated in the optical image blur correcting arithmetic section 503. However, the present invention is not limited to this. For example, the signal information analyzed in the signal analyzing section 505 may be output to the optical image blur correcting arithmetic section 503 so that the optical image blur correcting arithmetic section 503 calculates an amount of correction on the basis of the input signal analysis result and controls the lens shift driver 104 to change the correction range.

<Electronic Image Blur Correction Process>

Figure 7:
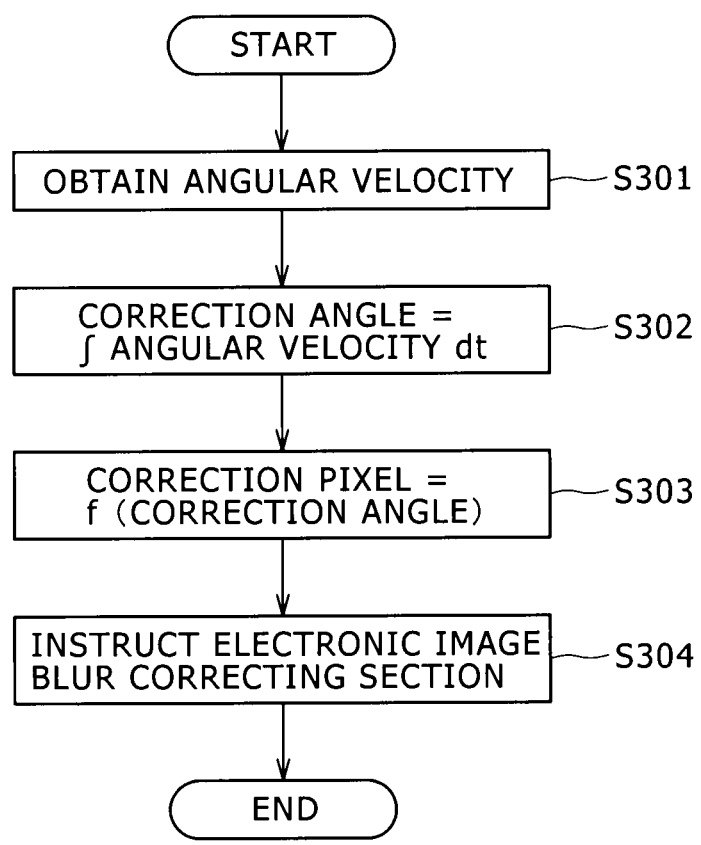
FIG. 7 is a flowchart of assistance in explaining a process of calculating an amount of electronic image blur correction in the image pickup device according to the present embodiment.

The electronic image blur correction process will next be described. FIG. 7 is a process flow of assistance in explaining a process of calculating an amount of electronic image blur correction. FIG. 8 is a diagram showing a performance region, an effective region, and a surplus region on an image pickup surface.

In the image pickup device 10 according to the present embodiment, as described above, an image blur signal detected in the image blur detecting section 400 is output to the arithmetic unit 500, and an image blur signal of a low-frequency component is extracted by subtracting an image blur signal of a high-frequency component extracted by passing the image blur signal detected in the image blur detecting section 400 through the HPF 501 from the image blur signal detected in the image blur detecting section 400 via the subtracting section 502. Then, the image blur signal of the extracted low-frequency component is output to the electronic image blur correcting arithmetic section 504. The electronic image blur correcting arithmetic section 504 first obtains an angular velocity from the image blur signal of the extracted low-frequency component in step S301.

Specifically, as in the angular velocity sensor such as a gyro sensor or the like in the above-described optical image blur correction process, amounts of positional movement in the x-direction and the y-direction are detected. The electronic image blur correcting arithmetic section 504 obtains an angular velocity from the amounts of positional movement.

After thus obtaining the angular velocity of the image blur signal of the low-frequency component extracted in step S301, the electronic image blur correcting arithmetic section 504 in next step S302 calculates a correction angle by time integration of the obtained angular velocity as in an equation shown in the following.

$$\text{Correction Angle} = \int \text{Angular Velocity } dt$$

After calculating the correction angle in step S302, the electronic image blur correcting arithmetic section 504 in next step S303 converts the calculated correction angle into a correction pixel on the basis of an equation shown below. In the case of the electronic image blur correction process, a correction unit is a pixel unit rather than the correction angle, and it is therefore necessary to convert the calculated correction angle into a correction pixel with the pixel as a unit.

$$\text{Correction Pixel} = f(\text{Correction Angle})$$

As an example of a relational equation for calculating the correction pixel, for example, the correction pixel can be calculated from an equation shown below or the like when the correction angle calculated from the angular velocity of the image blur signal is minute. However, the present invention is not limited to this, of course.

$$\text{Correction Pixel} = \text{Correction Angle} \times \text{Optical Magnification}$$

After thus calculating the correction pixel from the correction angle in step S303, the electronic image blur correcting arithmetic section 504 in step S304 indicates the calculated correction pixel to the image blur correcting section 202 in the image processing unit 200.

By the flow of such electronic image blur correction process, the electronic image blur correcting arithmetic section 504 determines a correction pixel for the image blur low-frequency component output from the subtracting section 502, and the electronic image blur correcting arithmetic section 504 indicates the correction pixel to the electronic image blur correcting section 202 via the electronic correction instructing section 508. Then, an image is recorded in the recording section 300 in a state of the image blur low-frequency component being cancelled out by the electronic image blur correcting section 202 on the basis of the supplied correction pixel.

More specifically, on the basis of the correction pixel calculated from the image blur signal of the detected low-frequency component, the performance region moved due to an image blur within the effective region is moved using the surplus region shown in FIG. 8. Thereby an image is recorded in the recording section 300 with the image blur low-frequency component cancelled out. Incidentally, suppose in the present specification that the effective region shown in FIG. 8 means an entire region on the image pickup surface, that the performance region means a part of the effective region extracted in image blur correction, and that the surplus region means a region for use in image blur correction.

The image pickup device 10 according to the present embodiment combines this electronic image blur correction and the optical image blur correction described above, and is thus able to record an image with an image blur of a high-frequency component and an image blur of a low-frequency component both cancelled out. For example, in a case where an image blur of a low-frequency component of large amplitude which image blur occurs when image pickup is performed from a moving body such as a car or the like is mixed with an image blur of small amplitude due to hand movement of a user or the like, the image blurs of respective frequency bands can be corrected with high accuracy.

By thus combining the optical image blur correction and the electronic image blur correction with each other, it is possible to secure a correction margin even for an image blur of large amplitude, and achieve effective image blur correction.

In addition, an image blur within an exposure period which image blur cannot be corrected by the electronic image blur correction process can be corrected by also using the optical image blur correction process.

As described above, the image pickup device 10 according to the present embodiment performs the optical image blur correction process on an image blur signal of a high-frequency component, and performs the electronic image blur correction process on a low-frequency component. When the low-frequency component of an image blur signal is processed by electronic image blur correction, a difference in readout system of the image pickup element being used involves a difference in correction process.

Description in the following will be made of the electronic image blur correction process of the image pickup device 10 according to the present embodiment for different image pickup elements.

<Correction Process for Different Image Pickup Elements>

In the image pickup device 10 according to the present embodiment, either of a CCD sensor and a CMOS sensor may be used as the image pickup element 103 of the image pickup device 10. However, because of a difference in readout system between the CCD sensor and the CMOS sensor, exposure timings of the CCD sensor and the CMOS sensor differ from each other, and control suitable for each image pickup element needs to be performed.

Specifically, the CCD sensor is a solid-state image pickup element whose readout system is a charge transfer type. In the case of the CCD sensor, all pixels can be exposed to light in a same period to read pixel data. In an image blur correction process using the CCD sensor, because exposure periods of all the pixels are equal to each other and no image distortion occurs, an amount of image blur correction necessary in performing a process for reducing effect of an image blur can be processed using a single value calculated on the basis of image blur information obtained within one field or one frame.

FIG. 9 shows image blur correction process timing of the CCD sensor. As described above, the electronic image blur correction process when the CCD sensor is used as an image pickup element operates only once in an image updating cycle because of the same amount of image blur correction for all the pixels.

On the other hand, the CMOS sensor is a solid-state image pickup element whose readout system is a two-dimensional address type, and readout is performed in order in units of one pixel or in units of one line.

Figure 10A:
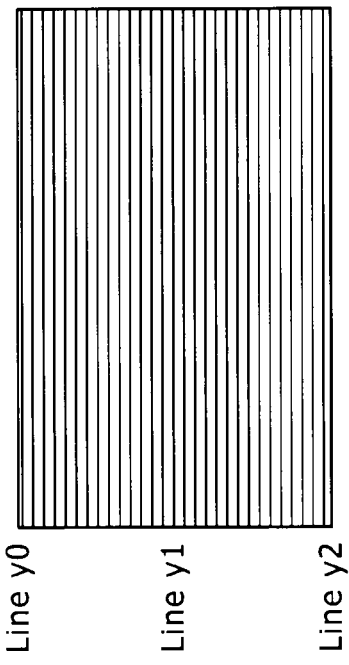
FIGS. 10A and 10B are diagrams of assistance in explaining a shift in readout of each line of a complementary metal oxide semiconductor sensor.
Figure 10B:
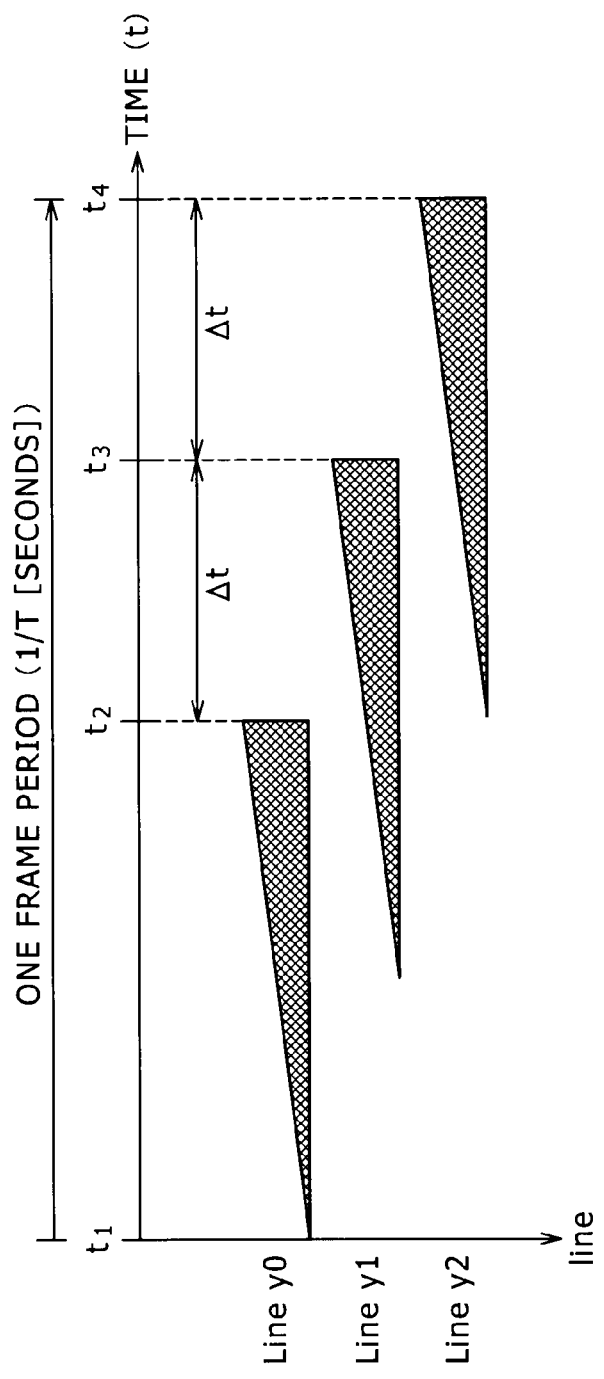

A CMOS sensor as an image pickup element in which readout is performed in line units will be described in further detail with reference to FIGS. 10A and 10B. FIGS. 10A and 10B are diagrams of assistance in explaining a shift in readout between lines of the CMOS sensor. Description in the following will be made by taking as an example the case of a CMOS sensor in which the readout cycle of all pixels is 1/T seconds and one screen is formed by lines y0 to y2. Incidentally, for the convenience of description, in FIG. 10B, three lines, that is, line y0, line y1, and line y2 within one screen are extracted, and the charge accumulation of each line and shifts in readout timing are shown.

Referring to FIG. 10B, the exposure period of line y0 has time t1 as a starting time and time t2 as an ending time. The exposure period of line y1 has time t3 as an ending time. The exposure period of line y2 has time t4 as an ending time.

A time difference between time t2 and time t3 is a time difference Δt, and a time difference between time t3 and time t4 is a time difference Δt. That is, the exposure period of each line has a time difference Δt. Hence, in this case, a time difference of 1/T seconds occurs between the exposure period of the uppermost line y0 and the exposure period of the lowermost line y2 in the screen. Because a time difference of 1/T seconds thus occurs between the exposure period of the uppermost line y0 and the exposure period of the lowermost line y2 (shift in exposure period) when one image is read, when an image blur occurs under conditions where this shift occurs, the image of an object as a subject is deformed due to the time difference between the exposure periods of the lines.

FIG. 11 shows image blur correction process timing of the CMOS sensor. As described above, in the electronic image blur correction process in which the CMOS sensor is used as an image pickup element, when the image blur correction process is performed with a single amount of correction calculated on the basis of image blur signal information obtained within one field or one frame, the effect of an image blur cannot be eliminated completely because a shift in exposure period (shift in image pickup timing) occurs in each line. As a result, an image provided to the user may be distorted. Hence, when the electronic image blur correction process is performed using the CMOS sensor, the correction process needs to be performed while an amount of correction is calculated for each line in one screen instead of a same amount of correction for all pixels as in the case of the CCD sensor.

Thus, whereas optical image blur correcting operation that can be processed independently of the image updating cycle can be processed in different synchronism from the image updating cycle, electronic image blur correcting operation is dependent on the readout system of the image pickup element, and needs to be processed in synchronism with the image updating cycle. Generally, in the CCD sensor, each pixel has simultaneity because all the pixels have same exposure starting and ending timing, whereas in the CMOS sensor, each pixel does not have simultaneity, and has different exposure timing.

Recently, increases in the number of pixels of the image pickup element due to the spread of high-definition devices have become common. To read the image pickup element having many pixels at high speed needs an XY address scanning type readout. In addition, an image pickup element of the XY address scanning type extracts the signal of each pixel by a selection system, so that the order of the extraction can be changed easily, and a high degree of freedom of scanning is obtained. Also in this respect, it is desirable to apply the image pickup element of the XY address scanning type to high-definition devices. Thus, from these viewpoints, there has recently been a stronger desire to apply the CMOS sensor as an image pickup element.

Further, the CMOS sensor has the following advantages. The CMOS sensor of the two-dimensional address scanning type can eliminate the occurrence of a smear as one type of noise as compared with the CCD sensor of the charge transfer type due to difference in operating system between the CMOS sensor and the CCD sensor. In addition, the CMOS sensor can be driven with smaller power consumption.

Accordingly, the electronic image blur correction process of the image pickup device 10 according to the present embodiment when the CMOS sensor is used as the image pickup element 103 will be described below in detail.

As described above, in the electronic image blur correction process, when the CMOS sensor is used as the image pickup element 103, the exposure timing of each line differs due to the readout system, and therefore an amount of correction for an image blur needs to be calculated for each region (line).

Figure 12A:
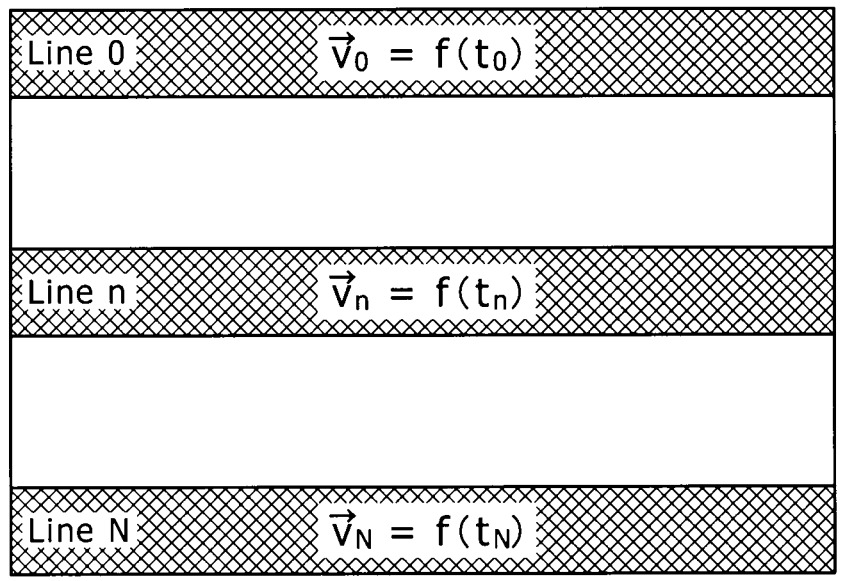
FIGS. 12A and 12B are diagrams of assistance in explaining adaptation of a different correction vector for each line in one image.
Figure 12B:
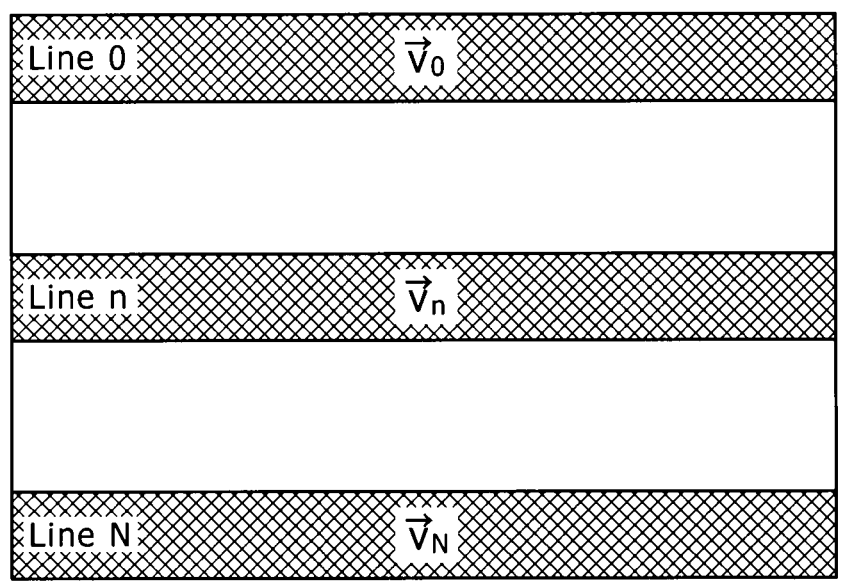

FIGS. 12A and 12B are schematic diagrams of assistance in explaining adaptation of a different correction vector for each line. FIG. 12A shows an image blur correction vector v with respect to time t in line 0, line n, and line N in one image. That is, an image blur vector at time t is calculated by a function f(t). FIG. 12B shows a correction vector in each line.

As described above, when the CMOS sensor is used as the image pickup element 103, exposure timing differs in each line in one image. Thus, as shown in FIGS. 12A and 12B, the image blur vector also differs in each line, and a correction vector quantity needs to be calculated for each line so as to cancel the image blur vector. The image blur is cancelled by calculating an image blur quantity and an amount of correction for each line in the electronic image blur correcting arithmetic section 504.

FIG. 13 is a diagram showing the image updating cycle and charge accumulation timing in each line. Incidentally, in FIG. 13, TB denotes the image updating cycle, TC denotes a charge accumulation period, TS denotes a sweep-out period at an electronic shutter, N denotes a line number, TO denotes a cycle of detection and correction of the optical image blur correcting arithmetic section, and TE denotes a cycle of detection and correction of the electronic image blur correcting arithmetic section.

As is understood from FIG. 13, the image pickup device 10 according to the present embodiment has an electronic shutter function. One charge sweep-out pulse is applied to an electronic shutter per horizontal scanning period, whereby an unnecessary charge accumulated so far in a light receiving part of the CMOS sensor is swept out. Thereby a state in which only a necessary charge is accumulated in the light receiving part of the CMOS sensor without an unnecessary charge being accumulated can be maintained. In addition, such an electronic shutter function can prevent the occurrence of an image blur due to an excessive charge accumulation time, that is, an excessive exposure time.

The image pickup device 10 according to the present embodiment thus has the electronic shutter function, and is thus able to perform proper charge accumulation. In detecting an image blur occurring in the device and calculating an amount of electronic image blur correction on the basis of the detected image blur signal, considering the period of charge sweep-out by the electronic shutter in the image updating cycle TB, it is necessary to detect an image blur signal at the center of the charge accumulation period TC, or the center of an effective exposure period (exposure center), and calculate an amount of correction from the detected image blur signal.

Referring to FIG. 13, for example, when a sampling point is set around the image updating cycle TB of 60 Hz at a sampling frequency of 480 Hz of electronic image blur correction, considering the charge sweep-out period TS of charge sweep-out by the electronic shutter, the setting is desirably made such that sampling timing coincides with the exposure center of the charge accumulation period TC. However, when the charge sweep-out period TS of charge sweep-out by the electronic shutter is set arbitrarily, the exposure center cannot necessarily be made to coincide with sampling timing.

Accordingly, in the image pickup device 10 according to the present embodiment, to detect a proper image blur signal and calculate a proper amount of correction for the image blur signal, the image blur signal at the exposure center of each line in one image is calculated, and a result of detection of the image blur signal at each sampling point of a fixed cycle is interpolated. Specifically, time t corresponding to the exposure center of each line is calculated from the following Equation 1, and from a result of the calculation, a correction vector v can be calculated for each line as shown in FIG. 12B.

$$t = m \times TB + \left(\frac{TB}{N}\right) \times n - \frac{TC}{2} \quad \text{[Equation 1]}$$

wherein,
m: field number,
n: line number,
N: the number of total lines,
TB: image updating cycle, and
TC: charge accumulation period.

Thus, the image pickup device 10 according to the present embodiment interpolates the image blur signal at a sampling point in the image updating cycle TB, and calculates an amount of correction on the basis of a result of the interpolation. Therefore highly accurate detection of the image blur signal and calculation of an amount of correction for the image blur are made possible. In addition, even when the electronic shutter function is performed arbitrarily, a proper amount of image blur correction can be calculated by calculating the exposure center t in the charge accumulation period TC from the above Equation 1.

In the electronic image blur correction process of an existing image pickup device, when the CMOS sensor is used as image pickup element, there occurs a shift in exposure timing between the upper part and the lower part of a screen, and therefore detection of an image blur on the basis of an image signal has a problem of a temporal shift of a subject on an image forming plane. It is difficult to compare temporally different things in each region, which tends to lead to a detection error. In addition, because image detection is easily affected by a subject, the image blur signal is erroneously detected in a low-contrast image, a high-frequency image, an image with a poor S/N, or the like.

However, the image pickup device 10 according to the present embodiment detects the image blur signal at the exposure center t of the charge accumulation period TC so as to interpolate the image blur signal in sampling timing, calculates the correction vector v at the point in time, and supplies the calculated correction vector v to the image blur correcting section 202 in the image processing unit 200. It is thereby possible to solve the above problems, and perform the electronic image blur correction process with high accuracy.

By thus achieving the electronic image blur correction process with high accuracy, an accurate correction process can be performed on image blurs in a low frequency band where many image blur signals have large amplitude.

The optical image blur correction process and the electronic image blur correction process of the image pickup device 10 according to the present embodiment has been described above. The image pickup device 10 according to the present embodiment thus performs an image blur correction process as a combination of optical image blur correction and electronic image blur correction. Therefore the image pickup device 10 according to the present embodiment can easily secure a sufficient correction margin, and perform a highly accurate correction process even on image blurs of large amplitude.

In addition, it is thereby possible to prevent increase in size of the lens and an actuator in the lens unit, and prevent attendant increase in weight of the device, as compared with the existing image pickup device. It is further possible to prevent increase in power consumption for shift driving of the lens, and degradation in optical performance and the like caused by greatly shifting the lens.

In addition, as compared with the existing image pickup device adopting an electronic image blur correction process, image degradation or the like due to a reduction of the performance region which reduction is attendant on securing a sufficient correction angle can be prevented.

<Correction Amount Allocating Control Flow>

As described above, by combining the optical image blur correction process and the electronic image blur correction process with each other, the image pickup device 10 according to the present embodiment can secure a large correction angle, and perform an efficient image blur correction process even on image blurs of large amplitude.

In addition, the image pickup device 10 according to the present embodiment can preferentially use optical image blur correction when the correction angle for correcting an image blur occurring in the device is relatively small, that is, when the amount of correction is small. Thus preferentially using optical image blur correction when the correction angle is small can prevent the occurrence of problems such as image degradation and the like involved in the electronic image blur correction process. This also makes it possible to reduce an amount of calculation of the image pickup device 10, and thus perform a correction process at high speed with a minimum necessary power.

In addition, an image blur correction process during exposure is made possible by thus preferentially performing the optical image blur correction process. A difference between optical image blur correction and electronic image blur correction lies in whether an image blur during the exposure period of the image pickup element can be corrected or not. Optical image blur correction can correct even image blurs during exposure, whereas electronic image blur correction cannot correct image blurs during exposure. As described above, in the case of electronic image blur correction, when the CMOS sensor is used as the image pickup element, for example, the exposure timing of the CMOS sensor is shifted. Therefore, an amount of correction differs in each line in one image, and the effect of being unable to correct image blurs during exposure is further increased.

Accordingly, the image pickup device 10 according to the present embodiment performs a process of giving priority to the optical image blur correction process by performing control on the basis of a correction amount limit. It is thereby possible to perform image blur correction during exposure as much as possible, and minimize a subject blur or the like occurring during the exposure. An optical image blur correction process prioritizing control mechanism will be described below in detail with reference to the block diagram of FIG. 6 again and a flowchart of FIG. 14.

As described above, FIG. 6 is a block diagram showing another example of configuration of the image pickup device 10 according to the present embodiment, in which control is performed on the basis of a correction limit in each of the correcting arithmetic sections 503 and 504.

As shown in FIG. 6, in addition to the configuration described with reference to FIG. 1, the arithmetic unit 500 of the image pickup device 10 further includes a limit controlling section 506, a lens shift driver instructing section 507, and an electronic correction instructing section 508.

An image blur signal of a high-frequency component of an image blur signal detected in the image blur detecting section 400 is input to the optical image blur correcting arithmetic section 503, and an image blur signal of a low-frequency component of the image blur signal detected in the image blur detecting section 400 is input to the electronic image blur correcting arithmetic section 504. After an amount of correction is calculated in each of the correcting arithmetic sections 503 and 504, the amount of correction is output to the limit controlling section 506. This limit controlling section 506 integrates the amounts of correction calculated in the respective correcting arithmetic sections 503 and 504, and determines whether a total amount of correction for an image blur which total amount of correction is calculated in the correcting arithmetic sections 503 and 504 is at a correction limit (correction amount max) of optical correction and electronic correction. Then, correction amount information from the limit controlling section 506 is output to each of the lens shift driver instructing section 507 for instructing the lens shift driver 104 to perform the optical image blur correction process and the electronic correction instructing section 508 for instructing the image blur correcting section 202 to perform the electronic image blur correction process. Then, the correction processes are performed on the basis of instructions from the instructing sections. The thus configured image pickup device 10 according to the present embodiment can perform the process of giving priority to the optical image blur correction process on the basis of the control of the limit controlling section 506.

The optical image blur correction process prioritizing control mechanism will be described in more detail with reference to the flowchart of FIG. 14. FIG. 14 is a control flow of assistance in explaining operation control for preferentially using the optical image blur correction process in the image pickup device 10 according to the present embodiment.

As described above, when detecting an image blur attendant on movement of the image pickup device 10 according to the present embodiment in the image blur detecting section 400, the image pickup device 10 outputs the image blur signal to the arithmetic unit 500, passes the image blur signal through the HPF 501, and separates the image blur signal into a high-frequency component and a low-frequency component. Then, in first step S401, of the separated image blur signals, the image blur signal of the high-frequency component is subjected to an optical image blur correcting arithmetic process, and the image blur signal of the low-frequency component is subjected to an electronic image blur correcting arithmetic process.

Specifically, as described above, after the image blur signal detected in the image blur detecting section 400 is input to the arithmetic unit 500, and the high-frequency component of the detected image blur signal is extracted in the HPF 501, the optical image blur correcting arithmetic section 503 calculates an amount of correction for the image blur signal in a high-frequency band. Meanwhile, the electronic image blur correcting arithmetic section 504 calculates an amount of correction for the image blur signal of the low-frequency component extracted by subtracting, in the subtracting section 502, the image blur signal of the high-frequency component extracted in the HPF 501 from the whole image blur signal detected in the image blur detecting section 400.

After the optical image blur correcting arithmetic section 503 thus calculates the amount of correction for the high-frequency component of the detected image blur signal and the electronic image blur correcting arithmetic section 504 thus calculates the amount of correction for the low-frequency component in first step S401, a total image blur correction amount and an optical image blur correction amount are compared with each other in next step S402. That is, a total amount of correction (total image blur correction amount) for an image blur which total amount of correction is obtained by adding together the amount of correction calculated in the optical image blur correcting arithmetic section 503 and the amount of correction calculated in the electronic image blur correcting arithmetic section 504 in step S401 is compared with an optical image blur correction limit amount. When a result of the comparison shows that "Total Image Blur Correction Amount (Vt)>Optical Image Blur Correction Limit (Vo_max)" (in the case of YES: Y in step S402), the process proceeds to step S403. When a result of the comparison does not show that "Total Image Blur Correction Amount (Vt)>Optical Image Blur Correction Limit (Vo_max)" (in the case of NO: N in step S402), on the other hand, the process proceeds to step S404.

When it is determined in step S402 that "Total Image Blur Correction Amount (Vt)>Optical Image Blur Correction Limit (Vo_max)," a setting is made in step S403 such that Optical Image Blur Correction Amount (Vo)=Optical Image Blur Correction Amount Limit (Vo_max)

Electronic Image Blur Correction Amount (Ve)=Total Image Blur Correction Amount (Vt)−Optical Image Blur Correction Amount Limit (Vo_max).

The process next proceeds to step S405.

On the other hand, when it is not determined in step S402 that "Total Image Blur Correction Amount (Vt)>Optical Image Blur Correction Limit (Vo_max)," a setting is made in step S404 such that Optical Image Blur Correction Amount (Vo)=Total Image Blur Correction Amount (Vt)

Electronic Image Blur Correction Amount=0.

After a setting is thus made such that Optical Image Blur Correction Amount (Vo)=Total Image Blur Correction Amount (Vt) and therefore a setting is made such that all of the detected image blur signal is processed by optical image blur correction in step S404, the process of this control flow is ended. The amount of correction calculated in the optical image blur correcting arithmetic section 503 is output to the lens shift driver 104 in the lens unit 100 of the image pickup device 10. The shift anti-vibration lens 102 is controlled on the basis of the amount of correction to perform the optical image blur correction process.

After the optical image blur correction amount (Vo) and the electronic image blur correction amount (Ve) are set in step S403, the electronic image blur correction amount (Ve) and an electronic image blur correction limit (Ve_max) are compared with each other in next step S405. That is, whether the electronic image blur correction amount (Ve) determined by subtracting the optical image blur correction amount (Vo) set to the optical image blur correction limit (Vo_max) from the total image blur correction amount (Vt) in step S403 is larger than the electronic image blur correction limit (Ve_max) is determined. When a result of the comparison shows that "Electronic Image Blur Correction Amount (Ve)>Electronic Image Blur Correction Limit (Ve_max)" (in the case of YES: Y in step S405), the process proceeds to step S406. When a result of the comparison does not show that "Electronic Image Blur Correction Amount (Ve)>Electronic Image Blur Correction Limit (Ve_max)" (in the case of NO: N in step S405), on the other hand, the process proceeds to step S407.

When it is determined in step S405 that "Electronic Image Blur Correction Amount (Ve)>Electronic Image Blur Correction Limit (Ve_max)," a setting is made in step S406 such that Optical Image Blur Correction Amount (Vo)=Optical Image Blur Correction Amount Limit (Vo_max)

Electronic Image Blur Correction Amount (Ve)=Electronic Image Blur Correction Limit (Ve_max).

Then the process of this control flow is ended. The amount of optical image blur correction set to the optical image blur correction limit is output from the optical image blur correcting arithmetic section 503 to the lens shift driver 104 in the lens unit 100. The shift anti-vibration lens 102 is controlled on the basis of the amount of correction to perform the optical image blur correction process. In addition, the amount of electronic image blur correction set to the electronic image blur correction limit is output from the electronic image blur correcting arithmetic section 504 to the image blur correcting section 202 in the image processing unit 200 of the image pickup device 10. The electronic image blur correction process is performed on the basis of the amount of correction.

On the other hand, when it is not determined in step S405 that "Electronic Image Blur Correction Amount (Ve)>Electronic Image Blur Correction Limit (Ve_max)," a setting is made in step S407 such that Optical Image Blur Correction Amount (Vo)=Optical Image Blur Correction Amount Limit (Vo_max)

Electronic Image Blur Correction Amount (Ve)=Total Image Blur Correction Amount (Vt)−Optical Image Blur Correction Amount Limit (Vo_max).

Then the process of this control flow is ended, and the correction process is performed without the amounts of correction set in step S403 being changed. Specifically, the amount of optical image blur correction set to the optical image blur correction limit is output from the optical image blur correcting arithmetic section 503 to the lens shift driver 104 in the lens unit 100. The shift anti-vibration lens 102 is controlled on the basis of the amount of correction to perform the optical image blur correction process. In addition, the electronic image blur correction amount (Ve) determined by subtracting the optical image blur correction amount (Vo) set to the optical image blur correction limit (Vo_max) from the total image blur correction amount (Vt) is output from the electronic image blur correcting arithmetic section 504 to the image blur correcting section 202 in the image processing unit 200 of the image pickup device 10. The electronic image blur correction process is performed on the basis of the amount of correction.

As described above with reference to FIG. 6 and FIG. 14, the image pickup device 10 according to the present embodiment has the limit controlling section 506 in the arithmetic unit 500 for calculating an amount of correction for an image blur signal, and is thereby able to control the amount of correction on the basis of a result of calculation of amounts of correction. Specifically, the limit controlling section 506 calculates a total amount of correction from the amounts of correction calculated in the optical image blur correcting arithmetic section 503 and the electronic image blur correcting arithmetic section 504. In addition, the limit controlling section 506 retains information on correction limit amounts for optical image blur correction and electronic image blur correction. The limit controlling section 506 compares the total amount of correction with the optical image blur correction limit amount. Further, the limit controlling section 506 compares each amount of correction calculated in each of the correcting arithmetic sections 503 and 504 with each image blur correction limit amount.

For example, a total amount of correction calculated in the optical image blur correcting arithmetic section and the electronic image blur correcting arithmetic section on the basis of a detected image blur signal is compared with the optical image blur correction limit amount, and when the calculated total amount of correction is equal to or smaller than the optical image blur correction limit amount, optical image blur correction is preferentially performed for the detected image blur signal. By thus giving priority to optical image blur correction on the basis of the control of the limit controlling section 506, it is possible to reduce a load of operation on the image pickup device, reduce power consumption, and perform a high-speed correction process. In addition, image blur correction during exposure is made possible, and thus a highly accurate image blur process can be performed.

In addition, preferentially performing the optical image blur correction process can further reduce image degradation due to an image blur as compared with the electronic image blur correction process that corrects the image blur in a pseudo manner after readout from the image pickup element.

Incidentally, the control for preferentially performing optical image blur correction as described above may be performed reflecting a result of signal analysis relating to the magnitude of amplitude by the signal analyzing section 505 provided in the arithmetic unit 500. Specifically, when an analysis of the signal analyzing section 505 shows that the detected image blur signal is a small-amplitude signal, information on the result of the analysis is supplied to the limit controlling section 506, for example. Then, the limit controlling section 506 may have optical image blur correction performed preferentially using the supplied information. In addition, when a signal analysis of the signal analyzing section 505 shows that the detected image blur signal is a small-amplitude signal, information on the result of the analysis is supplied to the HPF 501, for example. Then, the HPF 501 may stop a cutoff function for separating the image blur signal into different frequency bands using the supplied information, and output the whole image blur signal to the optical image blur correcting arithmetic section 503 so that optical image blur correction is performed on the basis of an amount of optical image blur correction for the whole image blur signal.

As described above, the image pickup device 10 according to the present embodiment can perform the optical image blur correction process and the electronic image blur correction process for different frequency bands. In addition, when the image pickup device 10 according to the present embodiment performs the optical image blur correction process and the electronic image blur correction process, the image blur signal detected by the image blur detecting section 400 as an integrated detecting section is output to the arithmetic unit 500 configured so as to enable collective control of the image blur detecting section and the image blur arithmetic sections, and each correction process amount is calculated. It is therefore easy to achieve consistency between the optical image blur correcting section and the electronic image blur correcting section, and a desired image blur correction result can be obtained easily.

Further, by thus performing collective control of each correction process, a correction process with reduced power consumption can be performed on the basis of analysis of the magnitude of amplitude of the image blur signal by the signal analyzing section 505 as described above. In addition, each amount of correction can be calculated in consideration of the correction limits in the respective correction processing sections, thus enabling a more efficient image blur correction process.

Further, by performing collective control of each correction process and controlling each correction process in accordance with the limit amount of each correction process, it is possible to perform an efficient and effective image blur correction process that prevents image degradation and increase in power consumption.

The processes for correcting an image blur as described above can be carried out not only by hardware having each function but also by software. When the series of processes is to be carried out by software, a program constituting the software is installed from a recording medium onto a computer incorporated in dedicated hardware, or for example a general-purpose personal computer that can perform various functions by installing various programs thereon.

Figure 15:
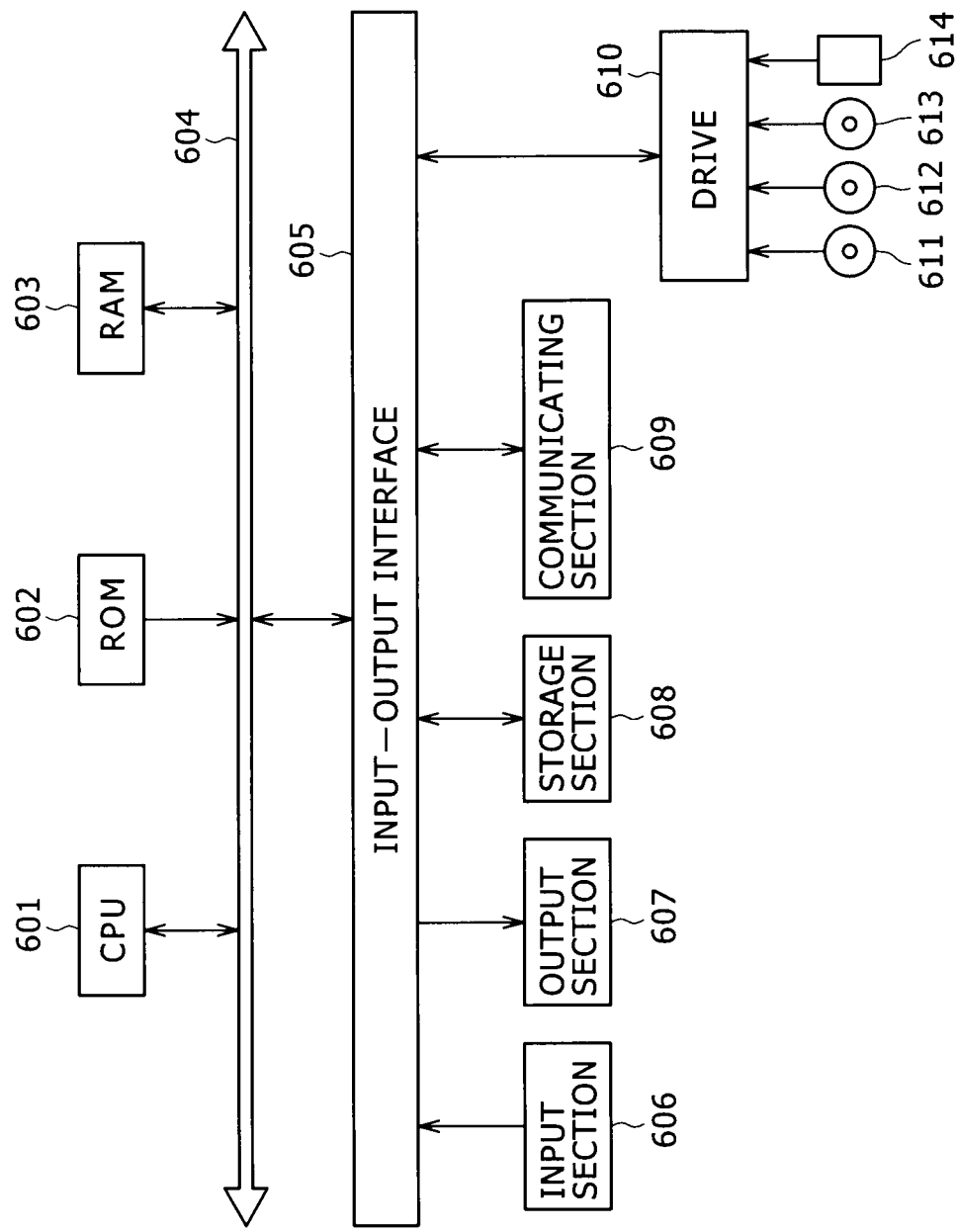
FIG. 15 is a diagram showing an example of configuration of a computer that implements the functions of the image pickup device according to the present embodiment.

To describe the recording medium, a personal computer handling the recording medium will be described briefly. FIG. 15 is a diagram showing an example of internal configuration of a general-purpose personal computer. A CPU 601 of the personal computer performs various processes in accordance with a program stored in a ROM (Read Only Memory) 602. A RAM (Random Access Memory) 603 stores data, programs and the like necessary for the CPU 601 to perform the various processes as required. An input-output interface 605 is connected with an input section 606 formed by a keyboard, a mouse, and the like, and outputs a signal input to the input section 606 to the CPU 601. The input-output interface 605 is also connected with an output section 607 formed by a display, a speaker and the like.

Further, the input-output interface 605 is connected with a storage section 608 formed by a hard disk or the like and a communicating section 609 for sending and receiving data to and from another device via a network such as the Internet and the like. A drive 610 is used to read data from the recording medium such as a magnetic disk 611, an optical disk 612, a magneto-optical disk 613, a semiconductor memory 614 or the like, and write data to the recording medium.

As shown in FIG. 15, the recording medium is not only formed by packaged media that are distributed to provide the program to the user separately from the personal computer and have the program recorded thereon, the packaged media including the magnetic disk 611 (including flexible disks), the optical disk 612 (including CD-ROM (Compact Disk-Read Only Memory) and DVD (Digital Versatile Disk)), the magneto-optical disk 613 (including MD (Mini-Disc) (registered trademark)), the semiconductor memory 614 or the like, but also formed by the ROM 602, the hard disk including the storage section 608, or the like that is provided to the user in a state of being preincorporated in the computer and which has the program stored therein or thereon.

It is to be noted that in the present specification, the steps describing the program provided by the medium include not only processes carried out in time series in the described order but also processes carried out in parallel or individually and not necessarily in time series.

In addition, the present invention is not limited to the above embodiments, and various changes and modifications can be made without departing from the spirit of the present invention.

The present application contains subject matter related to that disclosed in Japanese Priority Patent Application JP 2008-162101 filed in the Japan Patent Office on Jun. 20, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising:
    an image pickup optical system configured to form a subject image;
    an image pickup element configured to generate a picked-up image from the subject image formed by said image pickup optical system;
    an image blur detecting section configured to output an image blur signal using a motion detecting sensor;
    an arithmetic section configured to calculate an amount of image blur correction including an amount of optical correction and an amount of electronic correction on a basis of said image blur signal;
    an optical image blur correcting section configured to move at least one of an optical element forming a part of said image pickup optical system and said image pickup element in accordance with said amount of optical correction; and
    an electronic image blur correcting section configured to correct electronically an image blur of said picked-up image by image processing based on said amount of electronic correction calculated by the arithmetic section,
    wherein the electronic image blur correction section is further configured to electronically correct the image blur of said picked-up image by shifting an effective region of the image based on a correction vector corresponding to the amount of electronic correction calculated on the basis of said image blur signal, and
    wherein said arithmetic section includes
        a separating section configured to separate said image blur signal into a high-frequency component and a low-frequency component,
        an optical image blur correcting arithmetic section configured to calculate said amount of optical correction on a basis of said high-frequency component, and
        an electronic image blur correcting arithmetic section configured to calculate said amount of electronic correction on a basis of said low-frequency component, and
    wherein said arithmetic section further includes a signal analyzing section configured to analyze amplitude of said image blur signal, and
    a controlling section configured to control the arithmetic section to disable the separating section to cease separation of the image blur signal into different frequency bands resulting in output of the entire image blur signal to the optical image blur correcting section when said amplitude is below a predetermined threshold.

2. The image pickup device according to claim 1, wherein said arithmetic section adjusts said amount of optical correction and said amount of electronic correction such that said optical image blur correcting section is used preferentially when a total amount of correction obtained by totaling said amount of optical correction and said amount of electronic correction is equal to or smaller than an image blur correction limit amount.

3. The image pickup device according to claim 1, wherein said image pickup element is a complementary metal oxide semiconductor image sensor, and
said electronic image blur correcting arithmetic section calculates an amount of correction for each region of said complementary metal oxide semiconductor image sensor.

4. An image blur correcting method comprising the steps of:
    separating an image blur signal detected by using a motion detecting sensor into a high-frequency component and a low-frequency component;
    calculating an amount of optical correction on a basis of said high-frequency component;
    calculating an amount of electronic correction on a basis of said low-frequency component;
    analyzing amplitude of said image blur signal;
    disabling the separating to cease separation of the image blur signal into different frequency bands resulting in calculating the amount of optical correction on the basis of the entire image blur signal when said amplitude is below a predetermined threshold;

performing an image blur correction process optically on a basis of said amount of optical correction; and performing an image blur correction process electronically on a basis of said amount of electronic correction, the image blur correction being electronically performed by shifting an effective region of a respective image based on a correction vector corresponding to the amount of electronic correction calculated on the basis of said image blur signal.

5. A non-transitory computer readable medium storing a program for making a computer perform an image blur correcting method, said image blur correcting method comprising the steps of:

separating an image blur signal detected by using a motion detecting sensor into a high-frequency component and a low-frequency component;

calculating an amount of optical correction on a basis of said high-frequency component;

calculating an amount of electronic correction on a basis of said low-frequency component;

analyzing the amplitude of said image blur signal;

disabling the separating to cease separation of the image blur signal into different frequency bands resulting in calculating the amount of optical correction on the basis of the entire image blur signal when said amplitude is below a predetermined threshold;

performing an image blur correction process optically on a basis of said amount of optical correction; and performing an image blur correction process electronically on a basis of said amount of electronic correction, the image blur correction being electronically performed by shifting an effective region of a respective image based on a correction vector corresponding to the amount of electronic correction calculated on the basis of said image blur signal.

* * * * *